US007520217B2

(12) United States Patent
Roberts et al.

(10) Patent No.: US 7,520,217 B2

(45) Date of Patent: Apr. 21, 2009

(54) METHOD AND SYSTEM FOR PRINTING ONTO A DEFORMABLE CAST POLYMER ARTICLE

(75) Inventors: Kristian G. Roberts, Riverton, UT (US); Kyler G. Roberts, Salt Lake City, UT (US); Matthew G. Wilson, Sandy, UT (US)

(73) Assignee: Design Imaging, LLC, Salt Lake City, UT (US)

( * ) Notice: Subject to any disclaimer, the term of this patent is extended or adjusted under 35 U.S.C. 154(b) by 312 days.

(21) Appl. No.: 11/346,989

(22) Filed: Feb. 2, 2006

(65) Prior Publication Data

US 2006/0201349 A1 Sep. 14, 2006

Related U.S. Application Data

(60) Provisional application No. 60/649,647, filed on Feb. 2, 2005.

(51) Int. Cl.

| | |
|---|---|
| ***B41F 17/00*** | (2006.01) |
| ***B29C 65/00*** | (2006.01) |
| ***B32B 37/00*** | (2006.01) |
| ***B29C 65/10*** | (2006.01) |
| ***B65H 37/00*** | (2006.01) |

(52) U.S. Cl. ........................... 101/41; 101/35; 156/499; 156/285; 156/540

(58) Field of Classification Search ................... 101/41, 101/35; 156/499, 285, 540

See application file for complete search history.

(56) References Cited

U.S. PATENT DOCUMENTS 3,396,067 A 8/1968 Schafer (Continued)

OTHER PUBLICATIONS www.dyesub.org.reviews/marble.htm, Cultured Marble from Creative Marblecase, accessed Jun. 15, 2006, 2 pages.

(Continued)

*Primary Examiner*—Anthony H Nguyen
*Assistant Examiner*—Leo T Hinze
(74) *Attorney, Agent, or Firm*—Thorpe North & Western LLP

(57) ABSTRACT

A printing system configured to print an image onto a deformable cast polymer article comprising: (a) means for supporting a deformable cast polymer article in preparation for printing thereon, the means for supporting comprising a pressure platen, the deformable cast polymer comprising a finished surface to be printed on and a secondary surface; (b) an image transfer medium located contiguous with the finished surface, the image transfer medium configured to produce the image on the finished surface upon transfer of an ink image, comprising one or more inks, supported by the image transfer medium; (c) means for applying pressure to the deformable cast polymer article in the form of a deformable pressure applicator, such as a flexible membrane, the means for applying being flexible and configured to deform and conform to a surface of the deformable cast polymer article, and to cause an opposing surface of the deformable cast polymer article, under heat, to inelastically deform and conform to the pressure platen, the means for applying also being configured to cause the image transfer medium to conform to the finished surface such that substantially all of the ink image is caused to be in contact with the finished surface; and (d) means for heating at least a portion of the cast polymer to a pre-determined temperature for a pre-determined time sufficient to achieve the inelastic deformation of at least a portion of the cast polymer article, and to effectuate the transfer of the ink image to the finished surface.

50 Claims, 12 Drawing Sheets

U.S. PATENT DOCUMENTS

| | | | | |
|---|---|---|---|---|
| 3,952,131 | A | 4/1976 | Sideman | |
| 4,098,184 | A * | 7/1978 | Okada et al. | 101/41 |
| 4,202,663 | A | 5/1980 | Haigh et al. | |
| 4,354,851 | A | 10/1982 | Hix et al. | |
| 4,406,662 | A | 9/1983 | Beran et al. | |
| 4,433,070 | A | 2/1984 | Ross et al. | |
| 4,670,084 | A * | 6/1987 | Durand | 156/540 |
| 4,841,016 | A | 6/1989 | Edwards | |
| 5,413,841 | A | 5/1995 | Mahn, Sr. et al. | |
| 5,641,372 | A * | 6/1997 | Okuno | 156/230 |
| 5,643,666 | A | 7/1997 | Eckart et al. | |
| 5,688,851 | A | 11/1997 | Kress | |
| 5,741,387 | A | 4/1998 | Coleman | |
| 5,800,904 | A | 9/1998 | Hallman et al. | |
| 5,904,986 | A | 5/1999 | Smith | |
| 5,948,333 | A | 9/1999 | Blackmon | |
| 6,780,512 | B2 | 8/2004 | Macedo | |
| 6,994,051 | B2 | 2/2006 | Sahr et al. | |
| 7,001,660 | B2 * | 2/2006 | Garitano | 428/195.1 |
| 7,137,426 | B2 * | 11/2006 | Neri et al. | 156/499 |
| 7,267,737 | B2 * | 9/2007 | Neri et al. | 156/230 |
| 2002/0131062 | A1 * | 9/2002 | Neri et al. | 358/1.9 |
| 2003/0017311 | A1 | 1/2003 | Garitano | |
| 2004/0023050 | A1 | 2/2004 | Kia et al. | |
| 2004/0089407 | A1 * | 5/2004 | Halewood | 156/230 |
| 2004/0092697 | A1 | 5/2004 | Kia et al. | |
| 2004/0157735 | A1 | 8/2004 | Hare | |
| 2005/0016101 | A1 | 1/2005 | Stewart | |
| 2005/0032452 | A1 | 2/2005 | Helwig | |
| 2005/0055931 | A1 | 3/2005 | Rochette | |
| 2005/0227006 | A1 | 10/2005 | Segall | |
| 2005/0261464 | A1 | 11/2005 | Schorr | |
| 2006/0283344 | A1 * | 12/2006 | Ferguson | 101/492 |

OTHER PUBLICATIONS

Amano, Ryozo et al., Development of new decorating method of FRP and FRA, Adv. Composit Mater., 2002, pp. 203-210, vol. 11, No. 2.

www.sd-exports.org/creative_marblecast/index.htm, Creative Marblecast MFG, Apr. 11, 2002, 2 pages.

Pressing Matters, Dye sublimation and specialty imprinting newsletter, 1st Quarter 2003, 12 pages, vol. 1-1.

www.dyesub.org/articles/whatdoineed.php, Getting started in dye sublimation help, what do i need?, Feb. 2001, 4 pages.

www.dyesub.org/articles.php, High quality low cost sublimation supplies, accessed Aug. 2, 2006, 2 pages.

http://searchwarp.com/swa61112.htm, D. Kaufman Sunrise International Company, solid surface vs cultured marble, May 6, 2006, 4 pages.

www.icpa.hq.org/consumers/culturedmarble.cfm, ICPA for consumers: what are cultured marble, cultured granite and cultured onyx, accessed Aug. 3, 2006, 1 page.

* cited by examiner

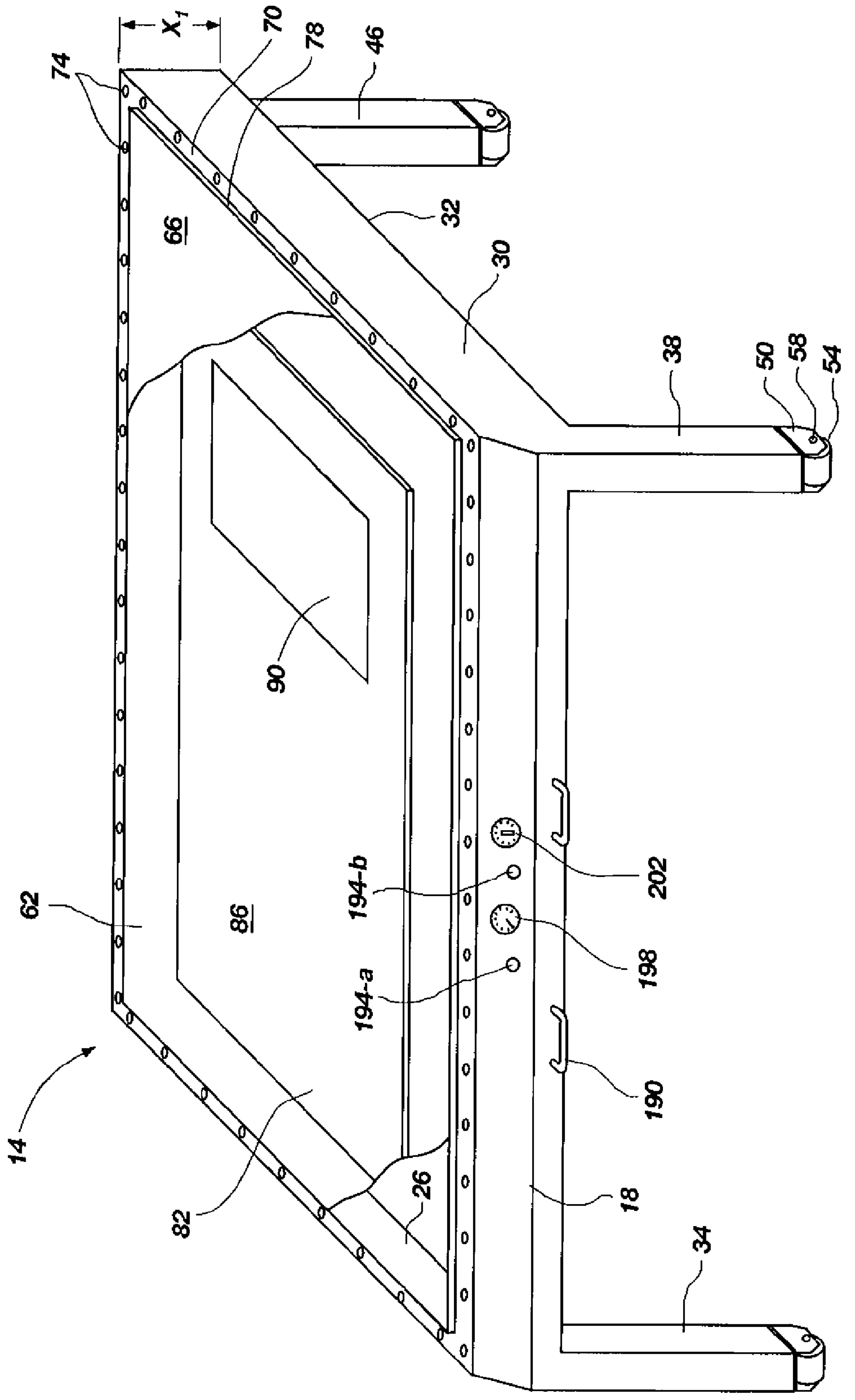
FIG. 2-A

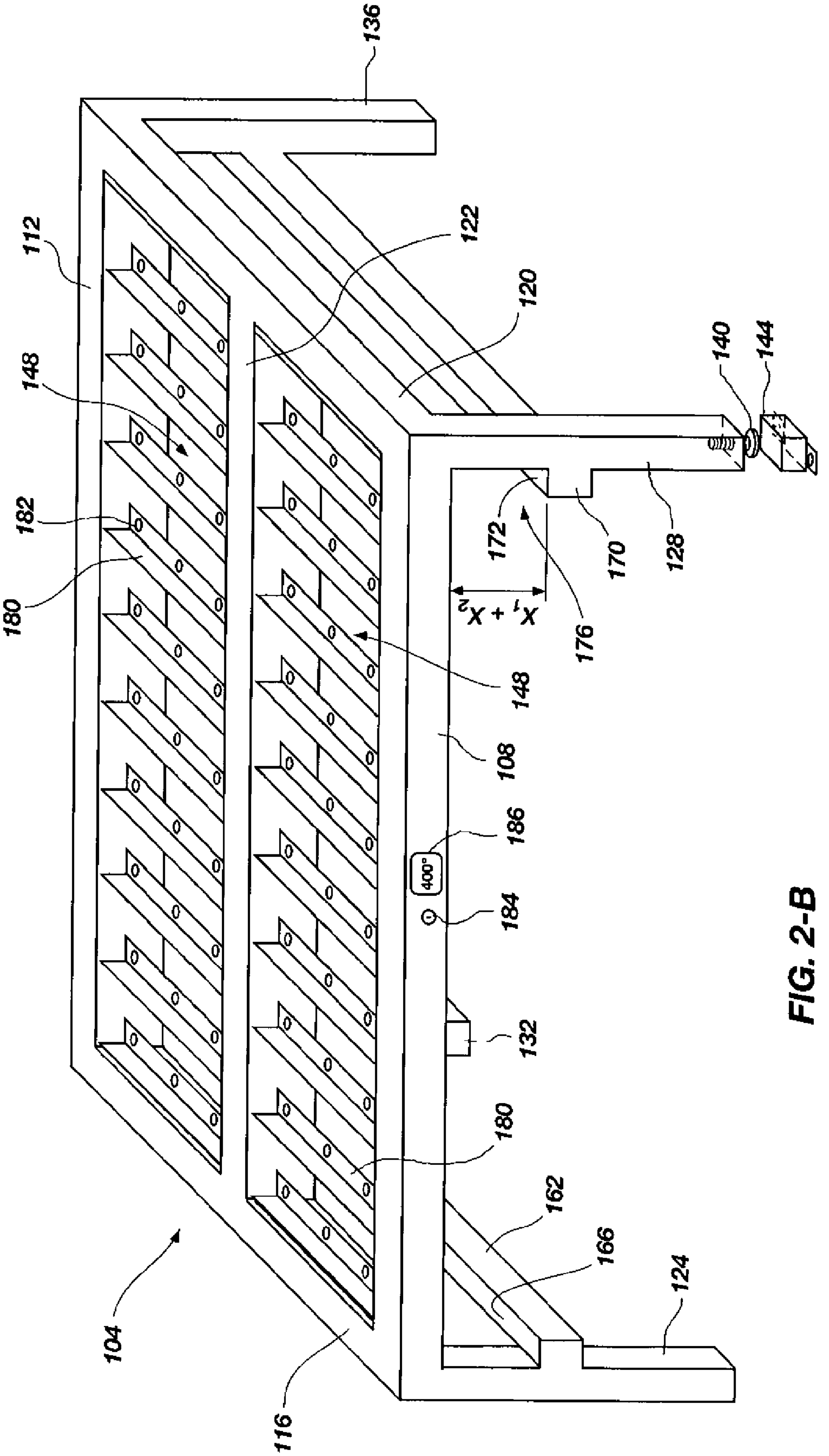
FIG. 2-B

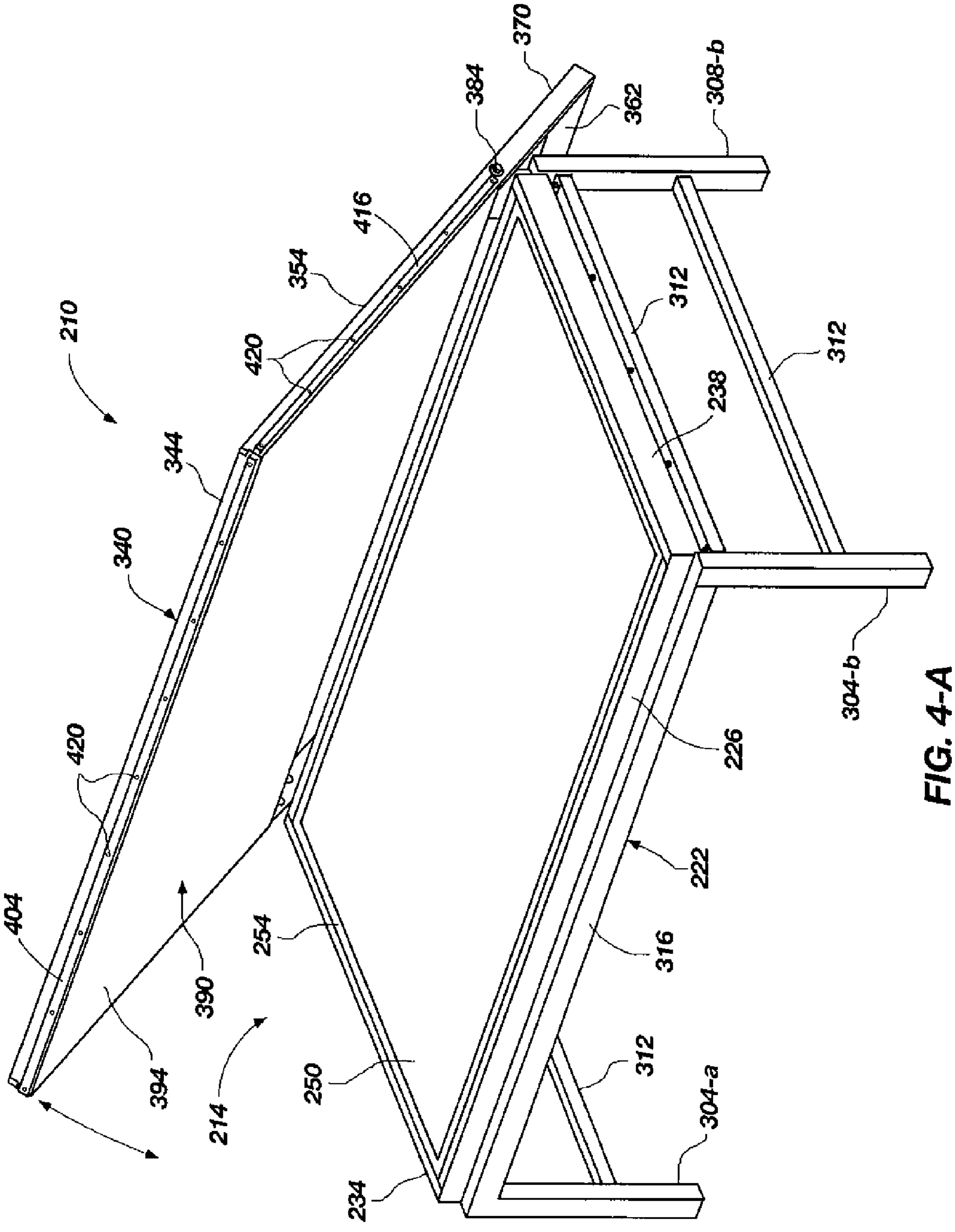
*FIG. 4-A*

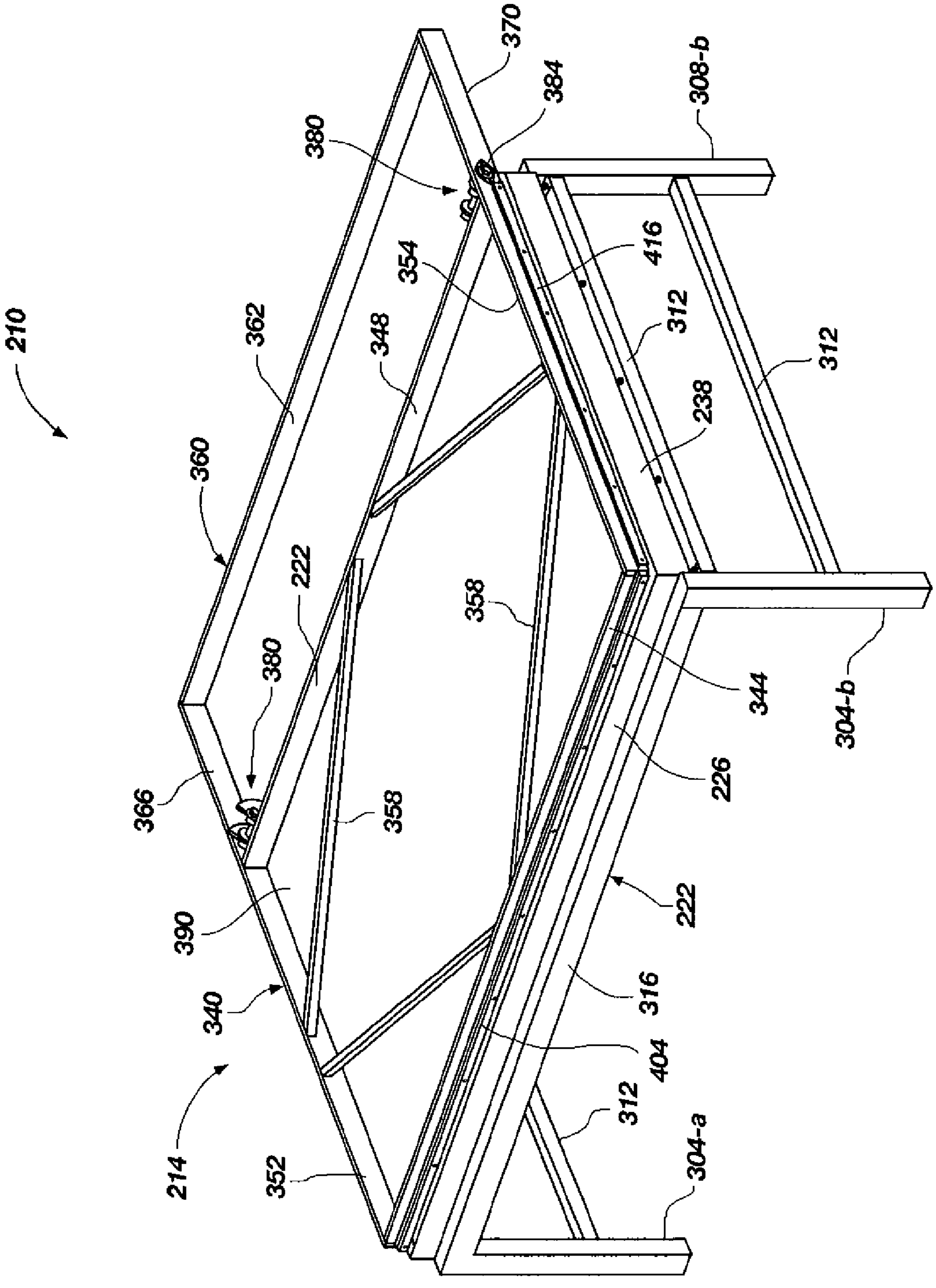
FIG. 4-B

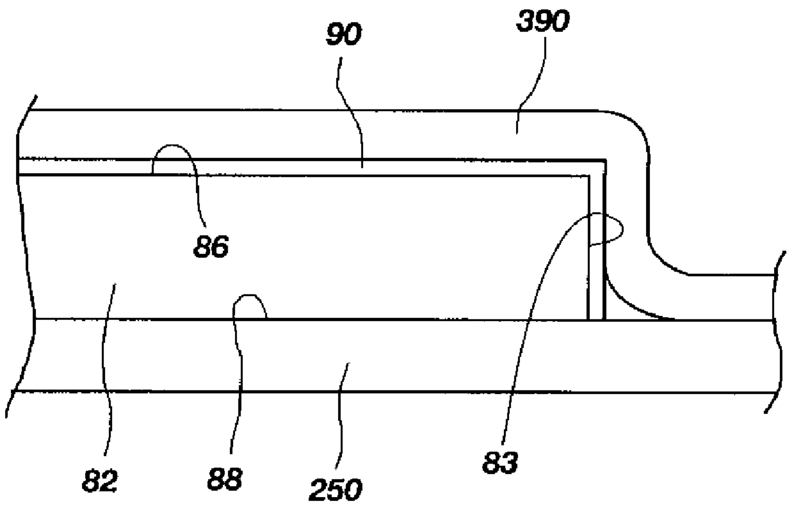
FIG. 9-A
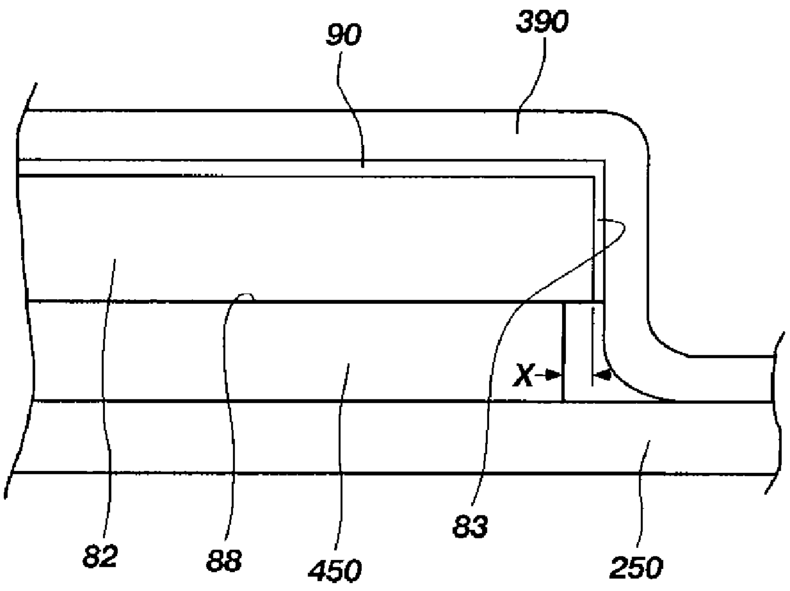
FIG. 9-B

METHOD AND SYSTEM FOR PRINTING ONTO A DEFORMABLE CAST POLYMER ARTICLE

RELATED APPLICATIONS

This application claims priority to U.S. Provisional Application Ser. No. 60/649,647, filed Feb. 2, 2005, and entitled, "Method and System for Printing Onto a Deformable Cast Polymer Article," which is incorporated by reference in its entirety herein.

FIELD OF THE INVENTION

The present invention relates to printing systems and methods for printing of images, patters, etc. onto a surface using a dye sublimation technique, and more particularly to various printing systems comprising a deformable printing configured to provide even and uniform support to a deformable cast polymer article, particularly cultured marble, during printing, as well as various methods for printing an image onto such deformable cast polymer articles.

BACKGROUND OF THE INVENTION AND RELATED ART

There are currently several horizontal and vertical decorative finishing materials that exist in the marketplace and that can be used in residential and/or commercial settings. Among those decorative finishing materials that are the most popular include synthetic deformable cast polymer materials having a gloss or high-gloss coating, which include, but are not limited to, cultured marble, cultured onyx, and cultured granite. These materials are extremely popular for use on kitchen and bathroom surfaces, such as countertops, sinks, bathtubs, showers, etc. Other uses for such deformable cast polymer materials include interior finishing elements (e.g., ceiling and wall coverings, facings, doors, moldings, window trimmings); furniture products (e.g., tables, chairs, shelving, and coat racks); illuminating devices (e.g., lamps, lighting fixtures, etc.); hardware accessories (e.g., plate covers for light switches and electrical sockets, knobs, picture or mirror frames, etc.); kitchen items (e.g., utensils, plates, etc.); bathroom items (e.g., soap dishes and dispensers); visual display items (e.g., signage, artwork, sculptures, etc.); and various other items.

Of these deformable cast polymer decorative finishing materials, cultured marble is probably the most popular amongst consumers due to its relatively inexpensive price, looks, and its ease of maintenance. The manufacturing of cultured marble is well known in the art. Generally, cultured marble comprises a polyester product having a translucent gel coat product sprayed onto a glass mold and allowed to dry. Once the coating is dry, a mixture of a marble dust and a polyester resin are poured into the mold and vibrated to allow the air bubbles to migrate away from the surface of the gel coat to the top or backside of the marble substrate. Typically these marble substrates have a color and a type of color pattern stirred into the second stage of this process to imitate marble veins. The cultured marble substrates are then allowed to cure until hard, at which time they undergo a finishing step, including stripping the substrate of any sharp edges, wherein the cultured marble substrate is ready for installation. Other deformable cast polymer decorative finishing materials are manufactured in a similar manner. For example, if cultured granite is desired, specially formulated chips will be blended together to make a salt and pepper looking cultured granite substrate. As such, the finished look of these decorative finishing materials may include solids or various patterns or designs.

In recent years, with the development of various printing techniques, it has been desirable to further finish a deformable cast polymer article by printing one or more images or patterns thereon. One of the more common printing techniques known in the art is referred to as heat transfer printing, which is the practice of printing onto various items, such as textiles or plastics, using dye sublimation. Dye-sublimation comprises an image or pattern printed onto an image transfer medium with a subliming dye or ink. Once an appropriate image is formed on the image transfer medium, the medium is pressed against the item on which the print is to be transferred and heated for a brief period of time, whereby the ink is vaporized and transferred to the item. The dye penetrates into the surface of the item, forming the design image or pattern supported on the image transfer medium. Other sublimation printing techniques are also well known in the art that involve a similar technique.

With the recent advent of digital printing techniques and systems, it is now possible to obtain high-resolution color images and to transfer these images onto such items, such as textiles and plastics, wherein the images comprise a high optical density. However, dye-sublimation using digital printing techniques is a relatively new concept and is continuously being developed and improved. There are several examples of systems and techniques for digital printing with dye-sublimation available in the art, many of which are provided by Sawgrass Technologies, Inc.

Although printing onto textiles and other similar items using one or more sublimation techniques is well known and has been carried out with a large degree of success, up until now, similar efforts to print onto a deformable cast polymer article having a coating thereon, such as cultured marble, have proven difficult and virtually unworkable, especially for substrates having a relatively large size. Difficulty in printing on deformable cast polymer articles arises in part from the limitations in the system and methods employed for printing, but more so to the difficult inherent characteristics in the deformable cast polymer article or material itself. One problem with printing onto a deformable cast polymer article stems from the fact that a deformable cast polymer article comprises an uneven surface that does not lend itself well to printing, except if the article is of a relatively small size. Moreover, it is difficult to achieve consistent optical density throughout the deformable cast polymer article.

Another associated problem during digital printing onto deformable cast polymer articles is blurring, which may be generally thought of as sublimation at undesirable times caused by the existence of excess residual gasses lodged within the image transfer medium. Excess gas, which is ink, may cause a "ghost image" to appear in the event there is a slight move in the media when the pressure of the platen or printing press is relieved. Blurring can also be caused if the media is not properly removed from the printing press. In typical dye-sublimation printing the media is only used a single time. However, it is possible to get a blurring effect from the left over gas from the image transfer. Blurring may also be a result of the physical properties of deformable cast polymers. During the printing process, the article will expand with the heat. However, the media carrying the image does not expand, thus creating a tendency for the image to be blurred.

SUMMARY OF THE INVENTION

In light of the problems and deficiencies inherent in the prior art, the present invention seeks to overcome these by providing a unique method and system for treating a finished surface of a deformable cast polymer article, particularly for the purpose of printing one or more high resolution images thereon using various dye or ink sublimation techniques.

In accordance with the invention as embodied and broadly described herein, the present invention features a printing system configured to print an image onto a deformable cast polymer article comprising: (a) means for supporting a deformable cast polymer article in preparation for printing thereon, the means for supporting comprising a pressure platen, the deformable cast polymer comprising a finished surface to be printed on and a secondary surface; (b) an image transfer medium located contiguous with the finished surface, the image transfer medium configured to produce the image on the finished surface upon transfer of an ink image, comprising one or more inks, supported by the image transfer medium; (c) means for applying pressure to the deformable cast polymer article, the means for applying being flexible and configured to deform and conform to a surface of the deformable cast polymer article, and to cause an opposing surface of the deformable cast polymer article, under heat, to inelastically deform and conform to the pressure platen, the means for applying also being configured to cause the image transfer medium to conform to the finished surface such that substantially all of the ink image is caused to be in contact with the finished surface; and (d) means for heating at least a portion of the cast polymer to a pre-determined temperature for a pre-determined time sufficient to achieve the inelastic deformation of at least a portion of the cast polymer article, and to effectuate the transfer of the ink image.

In one exemplary embodiment, the means for supporting is a printing press comprising a single pressure platen and the means for applying comprises an actuatable and flexible or deformable pressure applicator positioned relative to the pressure platen in the form of an inflatable bladder.

In another exemplary embodiment, the means for supporting is a printing press comprising a single pressure platen and the means for applying comprises an actuatable and deformable pressure applicator positioned relative to the pressure platen in the form of a flexible membrane operable with a negative pressure source, or operable to receive negative pressure to create a vacuum about the deformable cast polymer.

Although capable of printing images onto relatively small substrates, the present invention is particularly suited for printing images onto large cast polymer articles, or cast polymer articles of various shapes and geometries, wherein such sizes and geometries have heretofore proven unworkable for the digital printing of images of detail and/or high resolution. The ability to print onto such cast polymers is achieved by the present invention means for applying pressure, or even pressure, to either the finished or secondary surfaces of the cast polymer article. In one exemplary embodiment the means for applying even pressure comprises an inflatable bladder. The inflatable bladder operates using positive pressure and is configured to supply pressure to all the points, or substantially all points, of the cast polymer surface adjacent thereto, thus forcing the opposing surface (either the finished surface or the secondary surface depending upon which one is adjacent the bladder) against the surface of the pressure platen.

In another exemplary embodiment, the means for applying even pressure comprises a flexible membrane that deforms and conforms to a surface of the deformable cast polymer article, or at least a portion thereof, and that is operable with a negative pressure source to create a vacuum about the cast polymer article. As the pressure in the membrane is evacuated, the resulting negative pressure causes the membrane to supply pressure to all the points, or substantially all the points, of the desired surface, thus forcing all points of the opposing surface against the pressure platen, wherein, under heat, the cast polymer article deforms to the pressure platen. Thus, when heat is subsequently applied, the cast polymer article becomes malleable and all points of the surface adjacent the pressure platen conform to the surface of the pressure platen as a result of the pressure being applied to all of the points, or substantially all of points, of the opposing surface of the cast polymer. In addition, the flexible membrane is configured to deform and conform to, and thus pressurize, the surface of the cast polymer adjacent thereto. Pressurization may occur along the upper planar surface, along edges, within recesses, etc. The advantage of the flexible membrane is that it flexes or deforms under the negative pressure to conform to these surfaces. This is advantageous in another way in that the image transfer medium contiguous with the finished surface is also able to conform to the finished surface, thus producing a high quality print even on edges. The flexible membrane operating under negative pressure is able to accommodate both small and relatively large sized deformable cast polymer articles.

The present invention provides significant advantages over prior art printing systems and methods, as will be discussed below.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 2-A illustrates a perspective view of the movable cart component of the exemplary printing system of FIG. 1;

FIG. 2-B illustrates the stationary press component of the exemplary printing system of FIG. 1, wherein the stationary press component is configured to receive the movable cart component of FIG. 2-A;

FIG. 4-A illustrates a perspective view of a printing system according to another exemplary embodiment of the present invention, wherein the printing system comprises upper and lower frame assemblies that interact with one another to form a negative pressure environment for applying pressure to a deformable cast polymer article;

FIG. 4-B illustrates a perspective view of the exemplary printing system of FIG. 4-A shown in a closed position;

FIG. 9-A illustrates a cut-away, cross-sectional view of an exemplary printing configuration, wherein the cast polymer article is configured to receive edge printing thereon;

FIG. 9-B illustrates a cut-away, cross-sectional view of the exemplary printing configuration of FIG. 9-A, with the presence of a riser to elevate the cast polymer article above the surface of the pressure platen to achieve a more accurate edge print thereon;

DETAILED DESCRIPTION OF EXEMPLARY EMBODIMENTS

Figure 1:
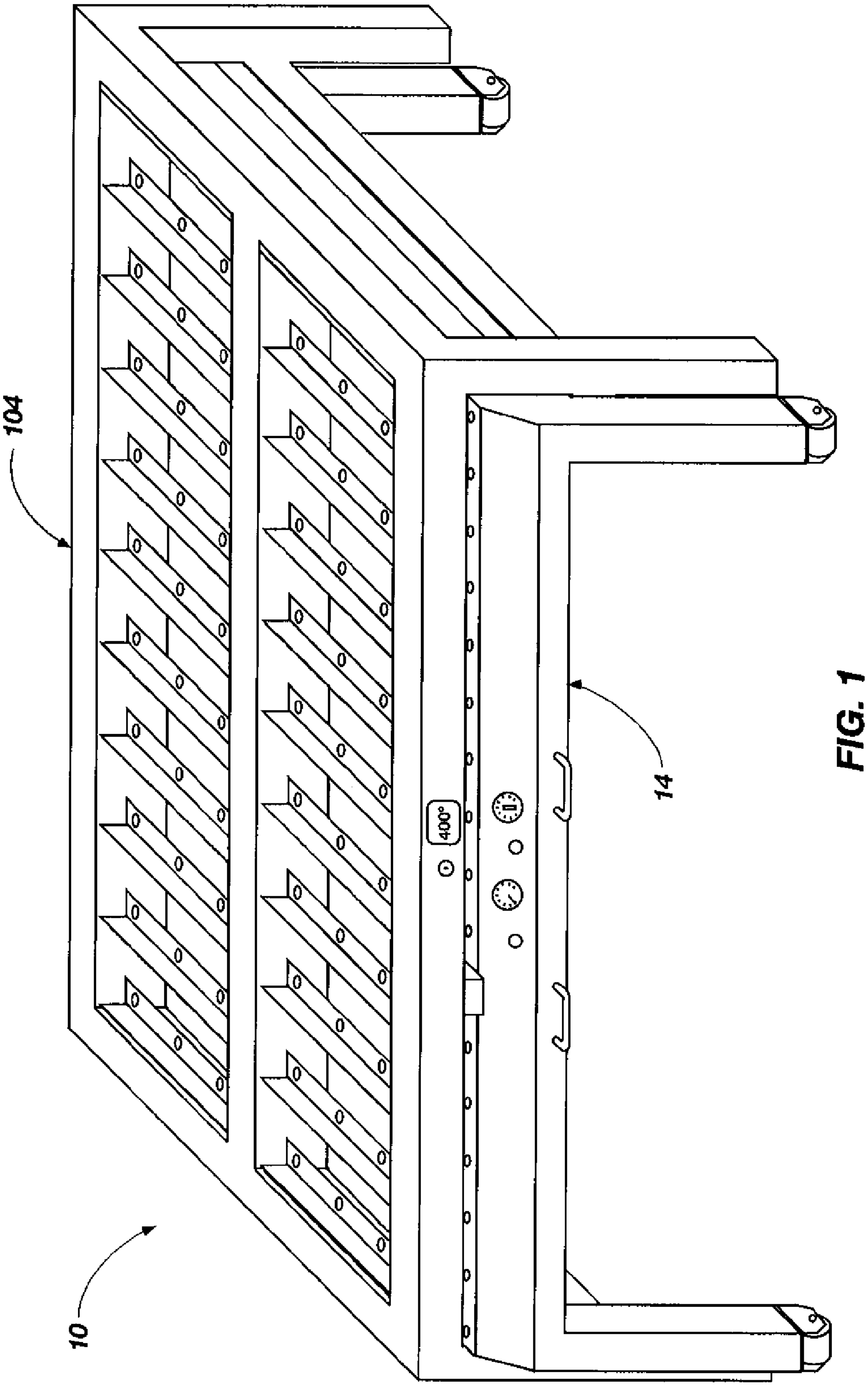
FIG. 1 illustrates a perspective view of a printing system according to one exemplary embodiment of the present invention, wherein the printing system comprises a movable cart and a stationary component shown in a coupled relationship, and wherein the printing system also comprises a flexible pressure applicator configured to apply even pressure to one or more surfaces of a deformable cast polymer article contained therein.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 11, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a method and system for first treating a deformable cast polymer article or substrate, and for subsequently digital printing onto the finished surface of the cast polymer substrate to achieve an image transfer of a high resolution image using one or more dye or ink sublimation techniques commonly known in the art. In essence, the present invention involves taking a print (i.e., a digital ink image formed on an image transfer medium), positioning it on or relative to a pre-determined printing location on the finished surface of a deformable cast polymer article, placing the cast polymer article within a printing system equipped with an actuatable and deformable pressure applicator, actuating the deformable pressure applicator to cause the pressure applicator to deform to the surfaces of the cast polymer article, thereby applying pressure to all of the points, or substantially all of the points, of the surfaces of the deformable cast polymer article, under heat, to effectuate the transfer of the image from the image transfer medium to the finished surface of the deformable cast polymer substrate. Upon cooling, the cast polymer article will retain its shape, or the shape of the cooling fixture, and the finished surface will comprise a high-resolution image thereon.

Heating functions to deform the cast polymer article so that the even pressure to the surface will cause all of the points, or substantially all of the points, of the finished surface to conform to the pressure platen or pressure applicator, or other component, depending upon the configuration of the particular printing system being used. Heat is applied to the deformable cast polymer article at a pre-determined temperature for a pre-determined time, sufficient to deform the cast polymer article and to effectuate transfer of the image onto the finished surface.

Use of a deformable pressure applicator has several advantages that will be realized herein. For example, use of a deformable pressure applicator provides the ability to pressurize substantially all points of one side of the cast polymer article, as well as the edges, of various shaped and sized cast polymer articles in preparation for printing thereon. Another advantage is the ability to achieve excellent finished surface printing, minimizing the potential for blurring or less than complete image transfer by causing the image transfer medium to be pressed against all points of the surface of the cast polymer article, including any surface irregularities. Still another advantage is the ability to achieve edge detail or edge printing, which may be done simultaneously with or alternatively to upper surface printing, and which may be accomplished using the same image transfer medium. Still another advantage is the ability to monitor the temperature of the surface of the cast polymer article during the heating stages of the cast polymer article, as well as prior to and during the image transfer or printing. This provides the ability to vary or adjust the heat transfer as needed.

Preliminarily, the phrases "cast polymer," "deformable cast polymer," "cast polymer material, "deformable cast polymer article," or "cast polymer product" as used herein, as well as similar phraseology, are general phrases that shall be understood to describe and define those products and/or finishing materials that are manufactured using known molding techniques, that are inelastically deformable, and that preferably, but not necessarily, have a gel coat top coating that might be clear, colored, gloss, satin, textured etc., called a "gel coat," applied during the manufacturing process, which coating becomes an integral part of the product. Examples of such cast polymers include, but are not limited to, cultured marble, cultured granite, and cultured onyx.

Although the present invention focuses on printing onto a deformable cast polymer article, it is noted herein that this is not intended to be limiting in any way. Indeed, some solid surface articles may also lend themselves to utilizing the methodology and techniques of the present invention, and are therefore considered to be within the scope of the present invention. In addition, other materials, objects, items, etc. capable of receiving a printed image thereon and that are capable of being supported within the printing press embodiments discussed herein, are also intended to be within the scope of the present invention. These include, but are not limited to polyester cloth (plastic sheet), PVC, ABS, various acrylics, polycarbonate, powder coated articles with polyester coatings, such as wood doors with raised panels, steel or coated steel, glass tiles or sheets that have been coated with acrylic or polyester coatings, ceramic tiles with no coating that the print can go all the way around the corners, polyester coated paper, fiber glass parts (such as boat hulls etc.), skis, PETG, power coated aluminum garage doors siding etc., rugs, and towels. As such, the item being printed on may comprise various shapes and sizes, not being limited to a planar panel. However, for discussion purposes, the following detailed description sets forth the printing systems and methods using a deformable cast polymer article having a substantially planar configuration.

The phrase "inelastically deformable," as used herein, as well as similar phraseology, shall be understood to mean a temperature and time dependant deforming characteristic of the cast polymer article that corresponds to the ability of the cast polymer article to repeatedly undergo deformation, with each deformation resulting in a permanent change of shape upon the cast polymer cooling.

The phrase "even image transfer," as used herein, as well as similar phraseology, shall be understood to mean the even and complete transfer of a high resolution image supported on an image transfer medium to all appropriate surface points, or substantially all of these points, of the finished surface (be it an upper surface and/or an edge) of the cast polymer during deformation, wherein the transferred image comprises a high-resolution and a good optical density. In other words, the finished surface onto which the image is being transferred is treated so that as many as possible relevant points are caused to be pressurized to facilitate the even transfer of the image, meaning that there are little or no inconsistencies in ink transfer (e.g., contrast, color, sharpness, tint, hue, and/or brightness, etc.) between one part of the image and any other part.

The phrase "image transfer medium," as used herein, as well as similar phraseology, shall be understood to mean any material or medium that is capable of receiving and supporting an ink image thereon. Common printing techniques that support dye sublimation are digital printing source (e.g. ink jet printers), offset, or rotogravure. The image transfer medium is intended to be configured to be positioned between the finished surface of a deformable cast polymer article and either the pressure platen (or other structure) or the pressure applicator for the purpose of transferring the image to the finished surface using one or more dye or ink sublimation techniques and under appropriate operating conditions. Examples of transfer media include, but are not limited to, ordinary printer paper, high quality ink-jet paper, fabric, and films.

The phrase "ink image," as used herein, as well as similar phraseology, shall be understood to mean the pre-determined arrangement of a color or combination of colors as supported on the image transfer medium prior to transfer onto the deformable cast polymer article, wherein the pre-determined combination and arrangement of colors is designed to result in the creation of a particular pre-determined image on the finished surface of a cast polymer article upon transfer thereto. The ink image is produced using any one of several known digital or other known printing techniques.

The term "image," as used herein, as well as similar phraseology, shall be understood to mean the resulting high resolution pre-determined color, or combination of colors arranged in any manner (such as to form a picture, pattern, solid color, etc.), as transferred onto the finished surface of a deformable cast polymer article from the image transfer medium, and as dictated by the ink image. The image on the finished surface of the cast polymer article refers to the resulting arrangement of dye or ink that has been sublimated into the finished surface.

The term "deformable pressure applicator," as used herein, shall be understood to mean a flexible membrane operable with one or more exemplary printing systems, such as those described herein, and which is configured to substantially conform to the shape of the cast polymer article during use. Indeed, the present invention contemplates the ability to print onto flat, planar surfaces, as well as various shaped articles having arbitrary, curved, planar, and/or nonplanar surfaces, or any combination of these. Depending upon the exemplary embodiment, the deformable pressure applicator may be configured for use within a positive or negative pressure printing system.

Exemplary Printing Systems and Methods

The present invention features various exemplary printing systems configured to treat a deformable cast polymer article or other similarly behaving article supported therein in preparation for printing on one or more of its finished surfaces, such as on its upper surface or on an edge thereof, or both. While printing systems with different configurations and/or designs may exist, each printing system shares at least one common element, namely means for applying even pressure to or along one or more surfaces of the deformable cast polymer article using a deformable pressure applicator. What is meant by the application of"even" pressure to the surfaces is that all relevant points of the surfaces of the cast polymer article are being pressurized to some degree by the deformable pressure applicator.

Means for applying even pressure comprises an actuatable and flexible or deformable pressure applicator existing in one or more forms. By actuatable, it is meant that the pressure applicator is not always stationary or inactive, but instead comprises an actuated state where constant or variable magnitudes of pressure may be exerted by the deformable pressure applicator as it is caused to displace, and a resting or inactive state where no pressure, or a nominal amount is being exerted. The two examples discussed below comprise an inflatable bladder (e.g., which operates with a positive pressure printing system) and a flexible membrane (e.g., which operates with a negative pressure printing system). In essence, the deformable pressure applicator may be configured to function with either positive or negative pressure printing systems.

In one exemplary embodiment, the printing system is designed so that the deformable pressure applicator initiates and maintains contact with all of the points, or substantially all of the points, located on the secondary surface that are opposite the portion of the finished surface receiving the image. Through the application of even pressure to the area of the secondary surface opposite the portion of the finished surface reviving the image, the printing system is able to provide greater treatment of the finished surface, namely to cause all of the points of the area of the finished surface receiving the image to deform and to conform to the surface of the pressure platen located opposite the deformable pressure applicator.

It is noted herein that application of even pressure to all or a designated area or portion of the surface(s) of the deformable cast polymer article or other article is intended to deform, if at all possible, all of the points of the area of the finished surface receiving the image so that all of these points adequately conform to the pressure platen to effectuate an even image transfer. However, it is recognized that all of the points on the unfinished surface opposite the area of the finished surface receiving the image may or may not be pressurized due to various reasons, such as the roughness of the secondary surface, the inability of the bladder to conform to the valleys existing in the secondary surface (because of the stiffness of the bladder or the size of the valleys, etc.), or various other physical or other constraints. Therefore, recitation of an "all points" contact is meant to be as many as possible, or a substantial amount, taking into consideration the physical and other constraints in place during each printing session. Similarly, all points of the finished surface may or may not be deformed and conform to the pressure platen due to similar physical and other constraints, such as those mentioned above. Therefore, the term "all points" when referring to the pressure applied to the secondary surface or the deformation and subsequent conforming of the finished surface shall be understood to mean substantially all points, if not all points. As such, it is important to note that it is intended herein that the present invention cover all systems or devices comprising or employing an actuatable flexible or deformable pressure applicator, wherein the actuatable and deformable pressure applicator is configured to supply even pressure (at any magnitude, varied or held constant) to a surface of a cast polymer article for the purpose of printing onto a finished surface.

In another exemplary embodiment, the deformable pressure applicator is caused to initiate and maintain contact with the finished surface of the cast polymer article. In such an embodiment, the deformable pressure applicator is actuated to supply even pressure to the finished surface of the cast polymer article for purposes of printing. Rather than deforming to a pressure platen, the deformable pressure applicator deforms or rather conforms to the finished surface of the cast polymer article, wherein sufficient pressure is applied to achieve image transfer. The various embodiments introduced above are discussed in more detail below.

With reference to FIG. 1, illustrated is a first exemplary embodiment of a printing system, wherein positive pressure from a pressure applicator is used to facilitate the printing of an image onto a deformable cast polymer article. It is noted herein, that the deformable cast polymer article may comprise any size or shape, not just a flat or substantially flat panel or substrate. The ability to print to various shaped items or objects is a function of the ability of the deformable pressure applicator, once actuated, to conform to the object and to apply pressure to various surfaces of the object. For example, the printing systems described herein may be used to print to the planar deck of a countertop and the interior edge ring extending down therefrom for an undermount sink bowl. Those skilled in the art will recognize the many different types of objects or items on which printing may be achieved.

Specifically, FIG. 1 illustrates, generally, printing system 10 as comprising a movable cart component 14 in an operably engaged position with a stationary press component 104. In this engaged position, the movable cart 14 and the stationary press 104 function to provide the means for supporting and operating an actuatable and flexible or deformable pressure applicator configured to supply even positive pressure (at any magnitude) across at least a portion of the secondary surface of a deformable cast polymer article inserted into the printing system. This pressure is applied concurrently with a predetermined amount of heat, or heat at a pre-determined temperature, for a pre-determined period of time to cause the cast polymer article, and particularly a finished surface, to deform or conform to the surface of a pressure platen supported within the printing system and positioned opposite the finished surface of the cast polymer article. Advantageously, the heat needed to deform the cast polymer article for printing purposes herein will by substantially below the article's glass transition temperature. Applying even pressure to the secondary surface of the deformable cast polymer article, along with the application of heat, functions to prepare the finished surface of the cast polymer article for printing an image thereon, and to achieve an even image transfer previously unattainable in prior related printing systems.

FIGS. 2-A and 2-B illustrate respective perspective views of the two primary components of the exemplary printing system of FIG. 1, wherein the printing system comprises a framework configured to support the means for applying even pressure, which means comprises a flexible or deformable pressure applicator in the form of an inflatable bladder. Specifically, FIG. 2-A illustrates a perspective view of an exemplary first component of printing system 10, namely a movable cart component 14 configured to releasably engage an exemplary stationary press component (shown in FIG. 2-B) during operation of printing system 10. Movable cart component 14 comprises an upper beam support assembly having a width $x_1$ and consisting of a front beam support 18, a rear beam support (not shown), and first and second side beam supports 26 and 30. Each of these horizontal supports are formed together in a square shape as shown, but may comprise other geometric configurations.

Extending from and providing support to the upper beam assembly of the movable cart 14 are a plurality of legs or leg supports. Specifically, extending from the junction of front beam support 18 and first side beam support 26 is front leg 34. Extending from the junction of front beam support 18 and second side beam support 30 is front leg 38. Extending from the junction of rear beam support and first side beam support 26 is rear leg 42. Extending from the junction of rear beam support and second side beam support 30 is rear leg 46. Rear legs 42 and 46 are positioned in an offset manner from front legs 34 and 38, as shown. Rear legs 42 and 46 are offset a pre-determined distance in order to allow movable cart 14 to engage the stationary press component. Specifically, rear legs 42 and 46 are offset so that side beam supports 26 and 30 may be inserted into the channel portion of the stationary press component configured to receive side beam supports 26 and 30, thereby releasably coupling the movable cart component 14 to the stationary press component. This is shown in greater detail in FIG. 3, described below.

Each of legs 34, 38, 42, and 46 comprise a roller attachment 50 coupled to its ground contacting end. Roller attachment 50 comprises a roller 54 that rotates about axle 58. Rollers 54 allow movable cart 14 to roll along the ground, and particularly to move to selectively engage and disengage the stationary press component. Preferably, rollers 54 are high quality heavy duty load rollers capable of withstanding or supporting large and heavy loads.

The upper beam support assembly is configured to support an actuatable flexible or deformable, inflatable bladder 62. As shown, inflatable bladder 62 spans the upper surfaces (not shown) of the various support beams forming the upper beam support assembly, and particularly the beam supports 18, 22, 26, and 30, so as to completely enclose the upper beam assembly. The inflatable bladder 62 is further supported by a steel plate 66, which itself is supported within or by the upper beam assembly. The steel plate 66 is a substantially flat plate fitting over or within the upper beam support assembly so as to effectively provide a surface configured to support the inflatable bladder 62, as well as one or more cast polymer articles, which is placed over the inflatable bladder 62 as shown.

During manufacture of the movable cart 14, the inflatable bladder 62 is disposed over the steel plate 66 in a relaxed or pre-stretched state and sealed to the upper beam assembly using a bracket 70, which is shown as a unitary piece coupled to the upper beam assembly using any known attachment or fastening means, such as screws 74. Bracket 70 extends around the entire perimeter of the upper beam support assembly so as to completely seal the inflatable bladder 62 to the upper beam support assembly. The bracket 70 may be substantially flat, or it may comprise an upwardly angled portion 78 along its inside edge to better accommodate the inflatable bladder 62 in its inflated state. The bracket 70 may also comprise separate pieces that fit together to perform the same function.

FIG. 2-A further illustrates a deformable cast polymer article 82 positioned or disposed about a surface 64 of the inflatable bladder 62. In the embodiment shown, deformable cast polymer article 82 comprises a cultured marble panel having a finished surface 86 and a secondary surface (not shown) opposite its finished surface 86, wherein the secondary surface is resting on and adjacent or juxtaposed to the surface 64 of the inflatable bladder 62. Although shown as a cultured marble panel, deformable cast polymer article 82 may comprise other shapes and other similar behaving materials as known in the art.

In one exemplary embodiment, inflatable bladder 62 is comprised of a silicone material that, when inflated properly, conforms to all or a portion of the secondary surface of the deformable cast polymer article 82 in contact with inflatable bladder 62. In the embodiment shown, once the deformable cast polymer article 82 is situated over the inflatable bladder 62 and the image transfer medium 90 is properly positioned in place, and once the movable cart 14 is caused to engage the stationary press (as discussed below), inflatable bladder 62 is inflated using any known means, such as an air compressor. The air compressor, having a tank of compressed air, is fluidly connected to one or more air inlets on the movable cart configured to facilitate the transfer or flow of air in and out of the inflatable bladder 62, such that actuation of the compressor causes the bladder to inflate. The effects of inflating bladder 62 are discussed in detail below.

Also illustrated in FIG. 2-A is image transfer medium 90 positioned on deformable cast polymer article 82 in a predetermined position corresponding to the desired position of an image to be printed or transferred onto finished surface 86 of deformable cast polymer article 82. Image transfer medium 90 comprises an ink image (not shown) supported therein or thereon, depending upon the type of medium and dye or ink used, wherein the ink image corresponds to or is arranged to print or transfer a pre-determined image onto at least a portion of finished surface 86. The image transfer medium 90 and its contained or supported ink image may comprise any size or shape, and any ink arrangement. Indeed, the image transfer medium 90 may comprise a sheet configured to transfer an image to only a portion of the finished surface 86 of the deformable cast polymer article 82, or the image transfer medium 90 may comprise a larger size configured to transfer an image to the entire finished surface 86. For example, an ink image in the form of a logo to be transferred to finished surface 86 may be contained in a smaller image transfer medium 90 than an ink image comprising an entire pattern to be transferred to finished surface 86.

Movable cart 14 further comprises handles 190 for facilitating the manipulation of movable cart 14, particularly in and out of the stationary press; a pressure applicator actuator switch for controlling the inflation of bladder 62 (shown as dual actuator switches 194-*a* and 194-*b* for safety); an air pressure gauge 198 for monitoring the pressure in the inflatable bladder 62; and a timer 202 for monitoring the duration of the printing session. Other controls may be implemented as will be recognized by one skilled in the art.

FIG. 2-B illustrates a perspective view of another component of printing system 10 complementary to the movable cart component 14, namely stationary press component 104, configured to releasably engage the movable cart component just discussed (shown in FIG. 2-A) during operation of printing system 10. Stationary press component 104 is similar in shape to the movable cart component in that it also comprises an upper beam assembly consisting of a front beam support 108, a rear beam support 112, and first and second side beam supports 116 and 120. Each of these horizontal beam supports are formed together in a square shape as shown, although other geometric configurations are possible. For additional stability, the upper beam assembly of stationary press component 104 may further comprise a lateral beam support 122 extending between first and second side supports 116 and 120 as shown.

Extending from and providing support to the upper beam assembly of the stationary press component 104 are a plurality of legs or leg supports. Specifically, extending from the junction of front beam support 108 and first side beam support 116 is front leg 124. Extending from the junction of front beam support 108 and second side beam support 120 is front leg 128. Extending from the junction of rear beam support 112 and first side beam support 116 is a rear leg 132. Extending from the junction of rear beam support 112 and second side beam support 120 is rear leg 136. Each of the front and rear legs further comprise, at their ground contacting ends, an adjustable foot 140 that is adjustably coupled to the legs and also to a boot 144 that secures to the ground or floor. Adjustable foot 140 allows the height of the upper frame assembly of stationary press 104 and the pressure platen attached thereto to be adjusted to accommodate deformable cast polymer articles of different thicknesses, as well as the height differential existing between the initial deflated state and the inflation state of the inflatable bladder of the movable cart during the printing process. For example, in one aspect if a deformable cast polymer article is loaded into the printing system 10 having a thickness of ½ inch, the adjustable foot 140 may be adjusted to position stationary press 104 at a lower height than for that of a deformable cast polymer article having a thickness of ¾ inches. In another aspect, the adjustable foot 140 may be adjusted to raise the stationary press 104 to accommodate a bladder inflating 2 inches versus one only inflating one inch. Boot 144 is securely fixed to the floor or ground to prevent unwanted side to side movement of the stationary press 104 during the printing operation. Specifically, boot 144 contains stationary press 104 when moving through its up and down cycles corresponding to the inflation and deflation of the bladder, respectively.

Stationary press 104 further comprises a pressure platen 148 disposed about the lower surfaces of the various support beams forming the upper beam assembly. In one aspect, the pressure platen 148 comprises an aluminum or steel plate having an outer facing, receiving surface (not shown) with a pre-determined tolerance. The upper beam assembly functions to secure pressure platen 148 in a fixed location, as well as to provide the structural support necessary to withstanding any forces exerted on pressure platen 148 during operation of the printing system 10. During operation of printing system 10, pressure platen is heated using means for heating operable with stationary press 104, which may comprise any system or device in the art capable of selectively heating an aluminum or steel plate, and particularly pressure platen 148, to a pre-determined temperature for a pre-determined duration or time. Preferably, the cast polymer article is heated to a temperature substantially below its glass transition temperature. In one exemplary operating environment, the pressure platen is heated to a temperature of 400° F. for approximately 2 minutes. At this temperature, any pressurized contact of pressure platen 148 with the finished surface of the deformable cast polymer article will cause the deformable cast polymer article, and particularly the finished surface in contact with the pressure platen, to deform. Since the inflatable bladder is itself deformable, it is configured to apply even pressure to all points, or substantially all points, of at least a portion of the cast polymer article's first or secondary surface, depending upon the desired placement orientation, at a pre-determined magnitude for a pre-determined time. This even pressure subsequently causes the finished surface, under heat, to deform and conform to the surface of pressure platen 148. Of course, as will be described below, the cast polymer article may be inverted so that its finished surface is in contact with the deformable pressure applicator. In this position, the deformable pressure applicator functions to apply even pressure to the finished surface rather than the secondary surface to effectuate even image transfer. In this position, the supplied heat may need to be altered to adequately penetrate the cast polymer article to properly heat the finished surface. Also, in this embodiment, the image transfer medium will be placed between the finished surface of the cast polymer article and the deformable pressure applicator.

With the finished surface adjacent the pressure platen 148, the heating of the pressure platen 148 combined with the even and/or all points pressure to the secondary surface of the deformable cast polymer article provides many unique advantages over prior art printing systems, including the advantage that no pre-heating of the deformable cast polymer article prior to printing is required. In addition, much less pressure is required to be exerted on the article to cause its finished surface to conform to the surface of the pressure platen. Still further, size is of no consequence. Indeed, even relatively large cast polymer articles can be made to receive a digital image thereon as long as all points of the portion of the finished surface (or even the entire finished surface) slated to receive the image is deformed to the pressure platen, which deformation is made possible by the application of an even pressure to substantially all of the points of the secondary surface below the portion of the finished surface receiving the image. Another advantage is that the deformable cast polymer article is held in place during the printing process, thus not allowing the article to expand until the pressure has been relieved and the image transfer completed. As such, the present invention eliminates one of the causes of blurring common in prior related printing presses.

FIG. 2-B illustrates and stationary press 104 further comprises a lower beam assembly positioned below the upper beam assembly. The lower beam assembly consists of a first lower beam support 162 extending from front leg 124 to the rear leg 132 of stationary press 104 in a manner parallel to first side support 116. Second lower beam support 170 is positioned opposite first lower beam 162 and extends from front leg 128 to rear leg 136 in a manner parallel to second side support 120. First and second lower beam supports 162 and 170 function with first and second side supports 116 and 120, as well as the front and rear legs, to define a channel 176 configured to receive the upper beam assembly of the movable cart, and particularly the first and second side supports of the upper beam assembly of the movable cart. Channel 176 comprises a channel width $x_1+x_2$ defined by the distance lower beam supports 162 and 170 are located or positioned from the upper beam assembly, where $x_1$ represents the width of the upper beam assembly of the movable cart and $x_2$ represents the remaining distance within channel 176 between the upper beam assembly of the movable cart and the upper and lower beam assemblies of the stationary press 104 upon inserting the movable cart within stationary press 104.

Stationary press 104 is shown further comprising a plurality of brackets 180 positioned between front and rear beam supports 108 and 112 and lateral beam support 122. Brackets 180 function to support the pressure platen 148 by drilling into the pressure platen 148 and inserting bolts or other fastening means into the pressure platen 148 that are configured and sized to extend up through the brackets 180 with adjustable nuts placed thereon. As such, adjusting the nuts functions to adjust the flatness and straightness of the pressure platen 148.

Stationary press 104 further comprises an actuation switch 184 for activating and deactivating printing system 10, as well as a temperature gauge 186 for monitoring the temperature of the pressure platen 148 and/or deformable cast polymer substrate.

Figure 3:
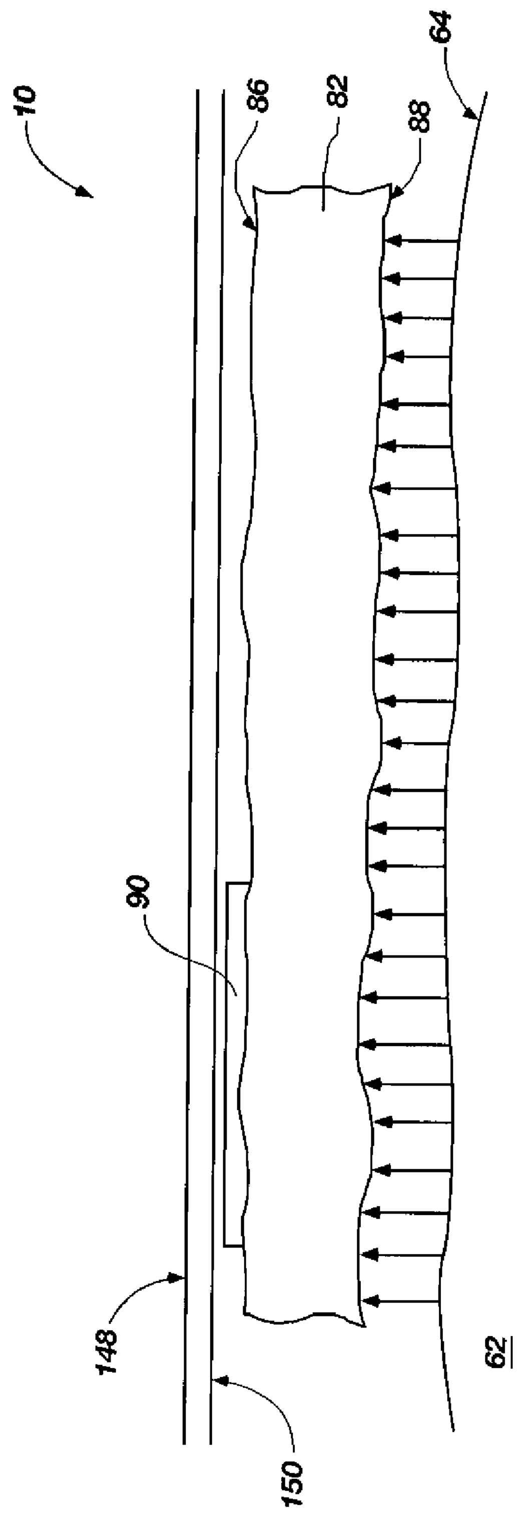
FIG. 3 illustrates a more detailed cut-away, cross-sectional view of the printing system of FIG. 1 according to one exemplary printing configuration, wherein the movable cart component of FIG. 2-A is releasably and operably engaged with the stationary press component of FIG. 2-B, and wherein a deformable cast polymer article is shown contained within the printing system and in receipt of an even points contact from a pressure applicator.

FIG. 3 illustrates a cut-away, cross-sectional side view of the various components of the exemplary printing system 10 described and shown in FIG. 1 arranged in an exemplary printing configuration as operational during a printing session. Specifically, FIG. 3 illustrates the deformable cast polymer article 82 contained or supported between the pressure platen 148 and the pressure applicator 62, shown as an inflatable bladder. FIG. 3 also illustrates the image transfer medium 90 positioned between the finished surface 86 of the deformable cast polymer article 82 and the receiving surface 150 of the pressure platen 148. Upon activating the printing system 10 and heating the pressure platen 148 to a suitable pre-determined temperature (typically well below the glass transition temperature), the inflatable pressure applicator 62 inflates and pushes against the unfinished or secondary surface 88 of the deformable cast polymer article 82. Since the pressure applicator is comprised of a flexible, deformable material, and thus has a deformable surface 64 thereon, an all points contact is made along the secondary surface 88 of the deformable cast polymer article 82, as represented by the several arrows. This all points contact is achieved as the inflatable pressure applicator 62 inflates and causes the deformable cast polymer article 82 to rise until it contacts the pressure platen 148. Moreover, due to the temperature of the pressure platen 148, the finished surface 86 of the deformable cast polymer article 82 deforms and conforms to the surface 150 of the pressure platen 148. In addition, the image transfer medium 90 situated therebetween also conforms to the surface 150 of the pressure platen 148. Thus, the even pressure applied to the deformable cast polymer article 82 and the image transfer medium 90 effectively provides a clean, high-resolution transfer onto the finished surface of the deformable cast polymer article 82.

It is noted herein, that the exemplary printing configurations illustrated in FIG. 3 is general in nature as comprising a pressure platen, a deformable cast polymer article, and a deformable pressure applicator that may be achieved by any number of printing systems appropriately configured to provide such a printing configuration. As such, the printing system of FIGS. 1-2 used to achieve this printing configuration 4-6, and 9 are not meant to be limiting in any way.

Referring now to FIGS. 4-A and 4-B, shown are perspective views of a printing system according to another exemplary embodiment of the present invention, wherein the printing system utilizes a negative pressure and associated heating system to prepare the surface of the deformable cast polymer article and effectuate printing. Specifically, FIGS. 4-A and 4-B illustrate printing system 210 as comprising a printing press 214 having a framework configured to operably secure and support an alternative type of means for applying even pressure, namely a pressure applicator 390 in the form of a flexible or deformable membrane, such as a silicone membrane, configured to be operable within a negative pressure system. The framework of the printing press 214 includes a stationary frame 218 comprised of a lower frame assembly 222 oriented in the horizontal and configured in a square or rectangular geometry, a plurality of legs supporting the lower frame assembly 222 off the ground, and an upper frame assembly 340.

Figure 5:
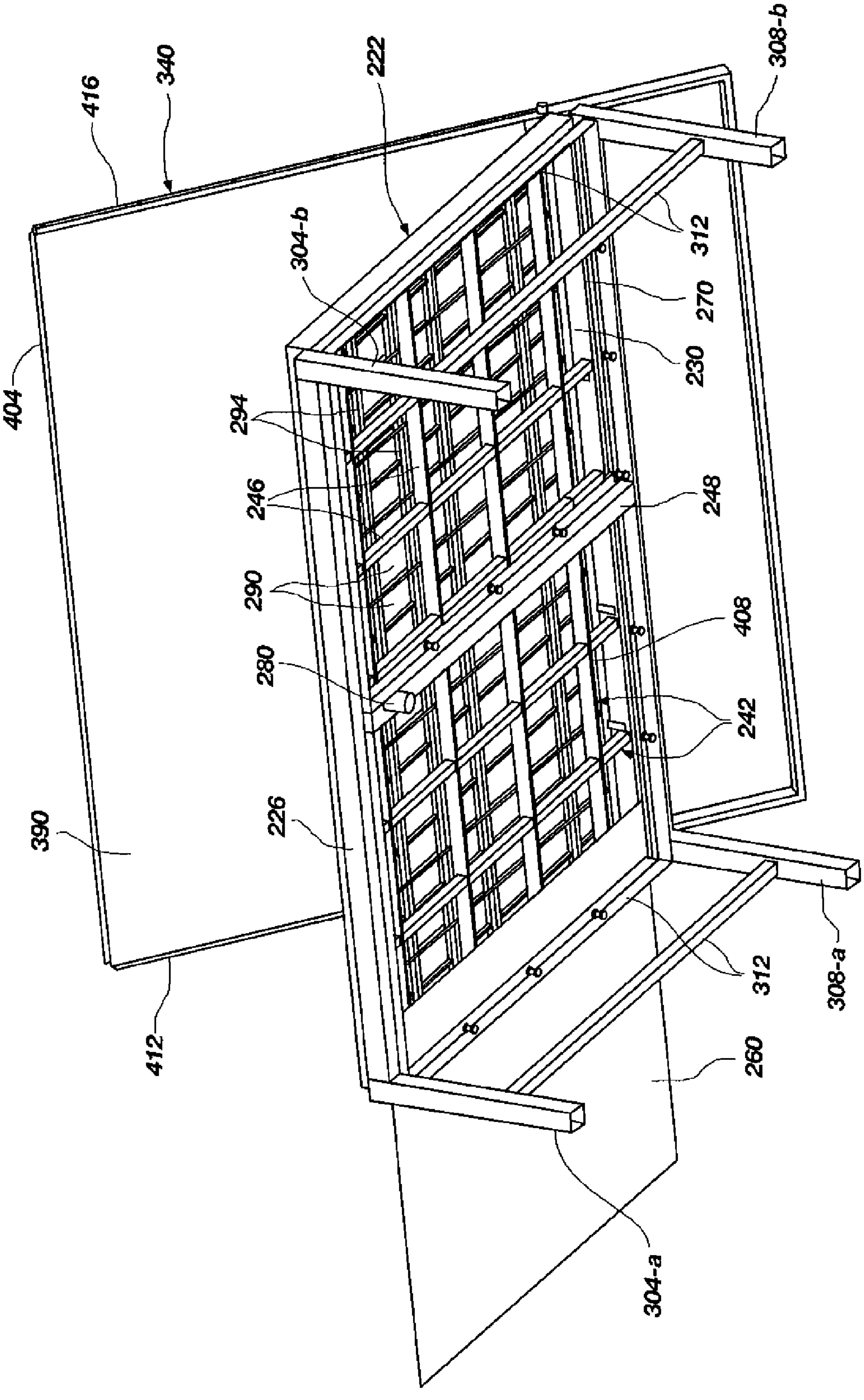
FIG. 5 illustrates an exploded perspective view of the exemplary printing system of FIG. 4-A showing the various components of the printing system.

With reference to FIGS. 4-A, 4-B, and 5, the lower frame assembly 222 comprises a front beam 226, a rear beam 230, and first and second side beams 234 and 238. The lower frame assembly 222 further comprises a support grid 242 configured to receive and support a pressure platen 250 thereon. The support grid 242 may comprise any number of cross beams 246 extending between of the front, rear, and side beams of the lower frame assembly 222, as shown in FIG. 5. The lower frame assembly 222 may further comprise a support beam 248 extending longitudinally between the first and second side beams 234 and 238, or laterally between the front beam 226 and the rear beam 230.

The lower frame assembly 222 functions to support the pressure platen 250 about the support grid 242. The pressure platen 250, once placed over the support grid 242, may be secured in its position using any known means. A raised frame 254 is located about the top surface of the pressure platen 250 and functions to retain the pressure platen 250, as well as to facilitate airflow or the evacuation of air from the surface of the pressure platen 250. The raised frame 254 is independent of and mounted to the respective front, rear, and side beam components 226, 230, 234, and 238 of the lower frame assembly 222, and is raised above the pressure platen 250 using a plurality of spacers 256 spaced apart from one another and located about the inside edge the front, rear, and side beam components 226, 230, 234, and 238 and beneath the raised frame 254, as shown. The raised frame 254 is described in more detail below with reference to FIG. 6. Essentially, the raised frame 254 is configured to provide various portals for air evacuation upon actuation of the vacuum means. In one aspect, the raised frame 254 comprises angle iron having one or more raised or protruding nubs formed thereon that rest against the surface of the pressure platen, thus providing the air portals. In another aspect, the raised frame 254, also comprising raised nubs, may be mounted using any known fastening means, such as bolts, screws, etc. Other mounting configurations are contemplated herein, such as bolting the pressure platen directly to the various components of the lower frame assembly 222. In addition, the pressure platen 250 is designed to rest on a plurality of adjustable standoff bolts, which function to support the pressure platen 148 in a floating or suspended manner while allowing for the expansion of the aluminum. The standoff bolts also allow for making the pressure platen flat and straight.

The pressure platen 250 is configured as a single piece of metal material substantially spanning the length and width of the lower frame assembly 222. A flat surface is desired, and preferably one with high tolerances, although this is not necessary as explained herein. The pressure platen 250 should be thick enough so as to maintain the integrity of its shape as much as possible under high heat and high pressure.

The lower frame assembly 222 further functions to support one or more vacuum chamber bottom covers 260. The vacuum chamber bottom cover 260 slidably engages and mounts within channels 270 formed along the inside surfaces of the front and rear beams 226 and 230. Vacuum chamber bottom covers 260 function as the lower barrier of the vacuum chamber formed within the printing system 210, which is located beneath the pressure platen 250. Vacuum port 280 is positioned below the pressure platen 250 to be within the vacuum chamber. Vacuum port 280 is configured to facilitate the removal of air from the vacuum chamber and from within the printing system 210 and is in fluid communication with a motorized vacuum means (not shown) designed to draw the air out of the printing system 210.

The printing system 210 further comprises a plurality of heat strips 290 supported beneath the pressure platen 250 by a plurality of heat strip mounting brackets 294 attached to the support grid 242, as shown. The heat strips 290 are designed and configured to conduct or otherwise supply the required heat to the pressure platen 250, and subsequently the deformable cast polymer article contained within the printing system 210 during a printing session. The heat strips 290 may be any known in the art. As shown, heat strips 290 comprise four inch wide metal strips that are approximately sixty inches long.

The lower frame assembly 222 further comprises a plurality of legs positioned in the four corners of the lower frame assembly 222, shown as front legs 304-*a* and 304-*b*, and rear legs 308-*a* and 308-*b*. Extending between front and rear legs 304-*a* and 308-*a* and front and rear legs 304-*b* and 308-*b* are lateral stabilizers 312 that function to provide lateral stability to the printing system 210. Longitudinal stabilizers may also be utilized to provide longitudinal stability to the printing system 210. Longitudinal stabilizer 316 is shown extending between front legs 304-*a* and 304-*b*.

The printing system 210, and particularly the printing press 214, further comprises an upper frame assembly 340 pivotally mounted or hinged to the lower frame assembly 222. The upper frame assembly 340 is designed to releasably mate with and seal against the lower frame assembly 222 to load and unload a deformable cast polymer article, and to facilitate printing on the deformable cast polymer article. The upper frame assembly 340 comprises a front beam 344, a rear beam 348, and first and second side beams 352 and 356 extending from one another to form a square or rectangular geometry. The upper frame assembly 340 also comprises a plurality of cross supports 358, as shown.

The upper frame assembly 340 is pivotally coupled to the lower frame assembly 222 using any known pivoting attachment means, shown as pivot assembly 380 that includes a pivot pin 384 therein. The pivot assembly 380 secures and aligns the upper frame assembly 340 with the lower frame assembly 222, while allowing the upper frame assembly 340 to rotate or pivot about the lower frame assembly 222, as indicated by the arrow in FIG. 4-A. As will be apparent to one skilled in the art, the upper frame assembly 340 may be made to rotate or pivot about the lower frame assembly 222 using other known means, such as a hinge mechanism. Upper frame assembly 340 has extending from its rear a counterweight 360, shown as frame components 362, 366, and 370. The counterweight 360 functions to balance or distribute the weight of the upper frame assembly 340 about the pivot assembly 380, thus easing the opening and closing of the upper frame assembly 340. Various types and designs of counterweights are contemplated other than the frame components shown herein, as will also be apparent to one skilled in the art.

The upper frame assembly 340 functions to support a flexible, deformable pressure applicator 390 within its frame components, as shown. The pressure applicator 390 may be comprised of various materials, but should at least be comprised of a material that is air-tight or that can function as one of the boundaries in a vacuum, and that is capable of applying the necessary pressure to the deformable cast polymer article within a negative pressure environment. As shown, the pressure applicator 390 is contained within the various front, rear, and side beams 344, 348, 352, and 356, respectively, of the upper frame assembly 340. The pressure applicator 390 may be sized to extend beyond the perimeter of these connected beam components where it is secured in place on the exterior of the beam components using mounting brackets, shown as brackets 404, 408, 412, and 416, located on each of the front, rear, and side beams 344, 348, 352, and 356, respectively. In this aspect, the portions of the pressure applicator 390 extending over or across the bottom surfaces of the beam components of the upper frame assembly 340 function to seal against the upper surfaces of the lower frame assembly 222 when the upper frame assembly 340 is brought in contact with the lower frame assembly 222. Alternatively, the pressure applicator 390 may be contained within the beam components, in which case a perimeter seal (e.g., a rubber gasket) may be used and applied to the bottom surfaces of the beam components of the upper frame assembly 340, which seal is configured to seal against the upper surfaces of the beam components of the lower frame assembly 222. In any event, the upper frame assembly 340 should seal against the lower frame assembly 222 to create a suitable air-tight or vacuum chamber in which air may be suctioned out to create a negative pressure environment around the cast polymer article being printed on. Mounting brackets 404, 408, 412, and 416 are mounted to the front, rear, and side beams 344, 348, 352, and 356, respectively, using any known attachment means, shown as screws 420.

Figure 6:
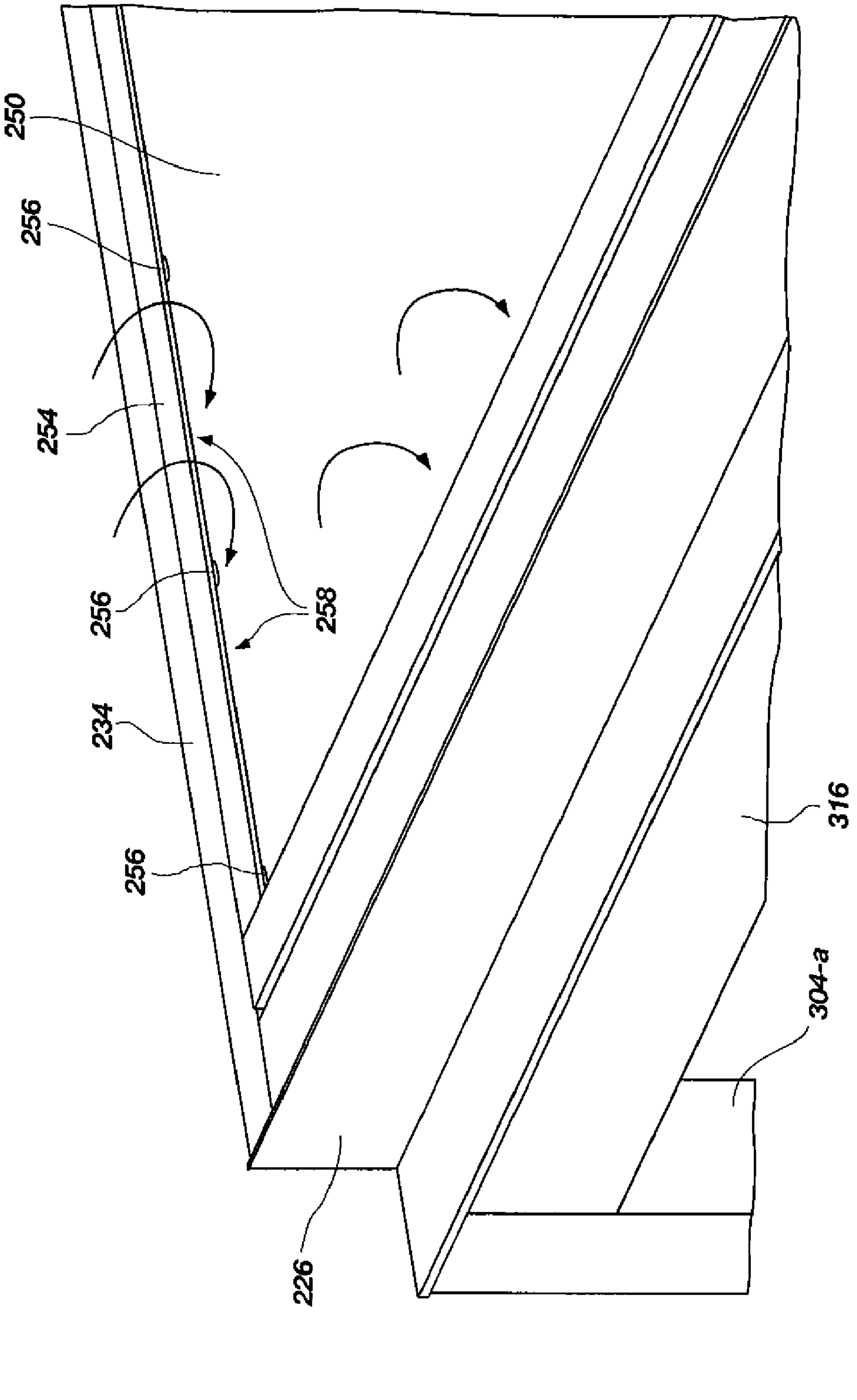
FIG. 6 illustrates a detailed perspective view of the association between the pressure platen and the frame components supporting the pressure platen to allow for the evacuation of air from across the surface of the pressure platen.

FIG. 6 illustrates a detailed view of the raised frame 254 as it functions to facilitate the evacuation of airflow from across the surface of the pressure platen 250. Specifically, the raised bracket 254 is supported above the surface of the pressure platen 250 by a number of spacers, shown as spacers 256. Positioning or locating the raised frame 254 above the surface of the pressure platen 250 creates a series of gaps or ports 258 through which air may flow. Thus, when the negative pressure or vacuum source is activated (assuming an adequate seal exists between the upper and lower frame assemblies), air present over the surface of the pressure platen 250 is forced to flow through the ports formed, through the vacuum chamber (not shown, but see FIG. 5), and out of the vacuum port (also not shown, but see FIG. 5). This creates a negative pressure environment within the printing system 14 that supplies the necessary pressure to cause the unfinished or secondary side of the cast polymer article to deform to the heated pressure platen, in a similar manner as discussed above, to achieve an all-points contact and to effectuate an even image transfer. In addition, the negative pressure causes the deformable pressure applicator or flexible membrane to conform to the finished surfaces of the cast polymer article, and the edges, if desired.

Referring back to FIG. 4-A, the printing system 210, and particularly the printing press 214, is illustrated with the upper frame assembly 340 in an open position. In this position, a deformable cast polymer article may be inserted into the printing press 214 with its unfinished or secondary surface juxtaposed or laying on the pressure platen 250 and its finished side facing upward. The article may be any size, and placed at any location on the pressure platen 250.

FIG. 4-B illustrates the printing system 210, and particularly the printing press 214, with the upper frame assembly 340 in a closed position sealed against the lower frame assembly 222. In this position, the printing press 214 is operational to print an image onto the deformable cast polymer article contained therein. Once the cast polymer article and the image transfer medium have been positioned within the printing press 214 and a proper seal has been established, a negative pressure or vacuum source is activated to evacuate the air from the vacuum chamber created between the upper and lower frame assemblies 340 and 222, respectively.

The printing system 210 operates as follows to print an image onto the finished surface of the deformable cast polymer article. With reference to FIGS. 4-A-6, once the deformable cast polymer article and image transfer medium are properly positioned, the upper frame assembly 340 is brought down to seal against the lower frame assembly 222. At this time, the heat strips 290 are activated to supply the heat to the pressure platen 250 and the cast polymer article, which heat is required for sublimation of the ink or dye from the image transfer medium to the cast polymer article. The deformable cast polymer article may be heated to any temperature capable of deforming the cast polymer article to effectuate printing thereon. As indicated above, the deformable cast polymer article is heated to a temperature substantially below its glass transition temperature. The negative pressure or vacuum source is also activated to evacuate air from the printing system 210. As the air in the vacuum chamber is evacuated, and the heat strips 290 turned on to heat the pressure platen 250 to a pre-determined temperature for a pre-determined amount of time, the pressure applicator 390 elastically deforms to conform to the finished surfaces of the cast polymer article and to supply a pressure thereon. This pressure also causes the cast polymer article to substantially conform to the heated pressure platen.

Figure 7:
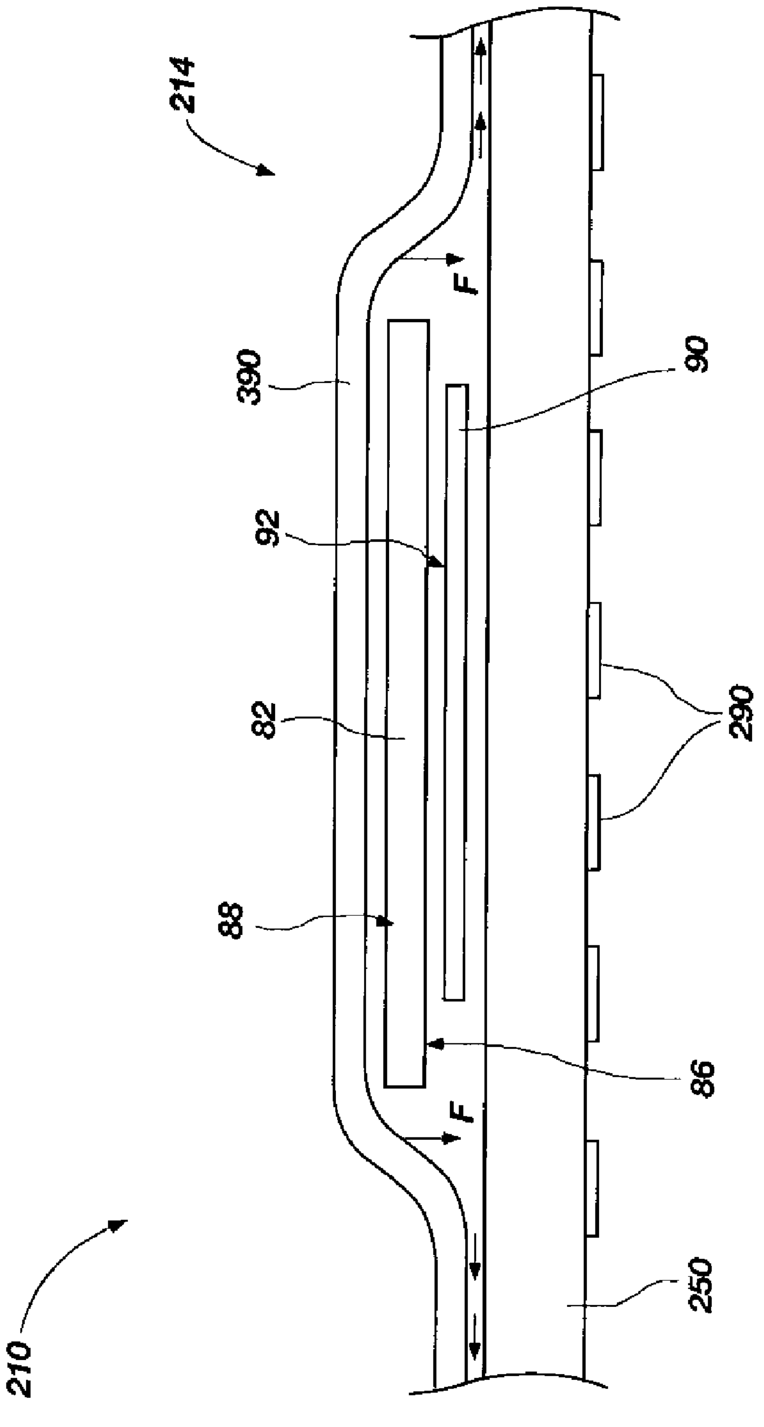
FIG. 7 illustrates a cut-away, cross-sectional view of an exemplary printing configuration utilizing the printing press of FIG. 4-A.

FIG. 7 illustrates an exemplary printing configuration. Specifically, FIG. 7 illustrates a cross-sectional and cut-away side view of the primary components of the present invention printing system 210, and particularly the printing press 214, of FIGS. 4-A-6, shown in a closed position and shown comprising a deformable cast polymer article 82 positioned between a pressure applicator 390, in the form of a flexible, deformable membrane, and a pressure platen 250 for the purpose of preparing a finished surface 86 of the deformable cast polymer article for printing thereon, and for subsequently effectuating printing. These components are shown somewhat exploded for reasons of explanation.

As can be seen from FIG. 7, the deformable cast polymer article 82 is oriented in an inverted manner such that its unfinished surface 88 is facing upward toward the pressure applicator 390. Thus, the finished surface 86 of the deformable cast polymer article 82 is facing toward and is adjacent the pressure platen 250 An image transfer medium 90 is shown positioned between the finished surface 86 of the deformable cast polymer article 82 and the pressure platen 250. In this configuration, the image side 92 of the image transfer medium 90 is brought into contact with the finished surface 86 of the deformable cast polymer article 82. Once the cast polymer article 82 and image transfer medium 90 are positioned, the vacuum means (not shown) that is fluidly coupled to the vacuum port (not shown) of the printing press 214 is actuated to evacuate the air from the vacuum chamber formed by bringing the upper frame assembly down upon the lower frame assembly to achieve a suitable air-tight seal between the two, as discussed above. Once this seal is created and once the vacuum means is activated, the air is evacuated from the vacuum chamber, as indicated by the arrows, and a negative pressure environment is created that causes the pressure applicator 390 to exert a force F upon the unfinished surface 88 of the deformable cast polymer article 82, as shown. The pressure applicator 390, shown as a silicone membrane, is configured to conform to the shape of the deformable cast polymer article 82, thus placing even pressure across the entire unfinished surface 88 regardless of the size or thickness or flatness variance of the deformable cast polymer article 82.

The finished surface of the deformable cast polymer article 82 is further prepared for printing by activating the heat strips 290 to effectively heat or increase the temperature of the pressure platen 250. Once the pressure platen 250 reaches a pre-determined temperature, the force F from the pressure applicator 390 coupled with the heat of the pressure platen 250 causes the deformable cast polymer article 82, as also heated to a pre-determined temperature from its interaction with the heated pressure platen 250, and particularly its finished surface 86, to conform to the surface of the pressure platen 250, thus achieving an all points contact of the finished surface 86 against the pressure platen 250. This all points contact occurs regardless of the flatness variation of the finished surface 86 of the deformable cast polymer article 82 or the flatness variation of the upper surface of the pressure platen 250 within reasonable tolerances.

The creation or achievement of an all points contact of the finished surface 86 of the deformable cast polymer article 82 provides a unique printing environment for a deformable cast polymer article. As indicated above, the image transfer medium 90 is positioned between the finished surface 86 and the pressure platen 250 where printing is desired onto the deformable cast polymer article 82. Since the image transfer medium 90 is itself comprised of a flexible medium, such as paper, the image transfer medium 90 also conforms to the surface of the pressure platen 250 on one side, and more importantly, the finished surface 86 of the deformable cast polymer article 82 on the other side, thus providing circumstances where an even image transfer is effectuated onto the deformable cast polymer article 82 from the image transfer medium 90. In the exemplary condition shown, the pressure platen 250 is heated to a temperature between 350° and 400° F., the vacuum means is activated, and thus pressure exerted on the deformable cast polymer article between 4-12 p.s.i for a duration of 2-3 minutes.

Figure 8:
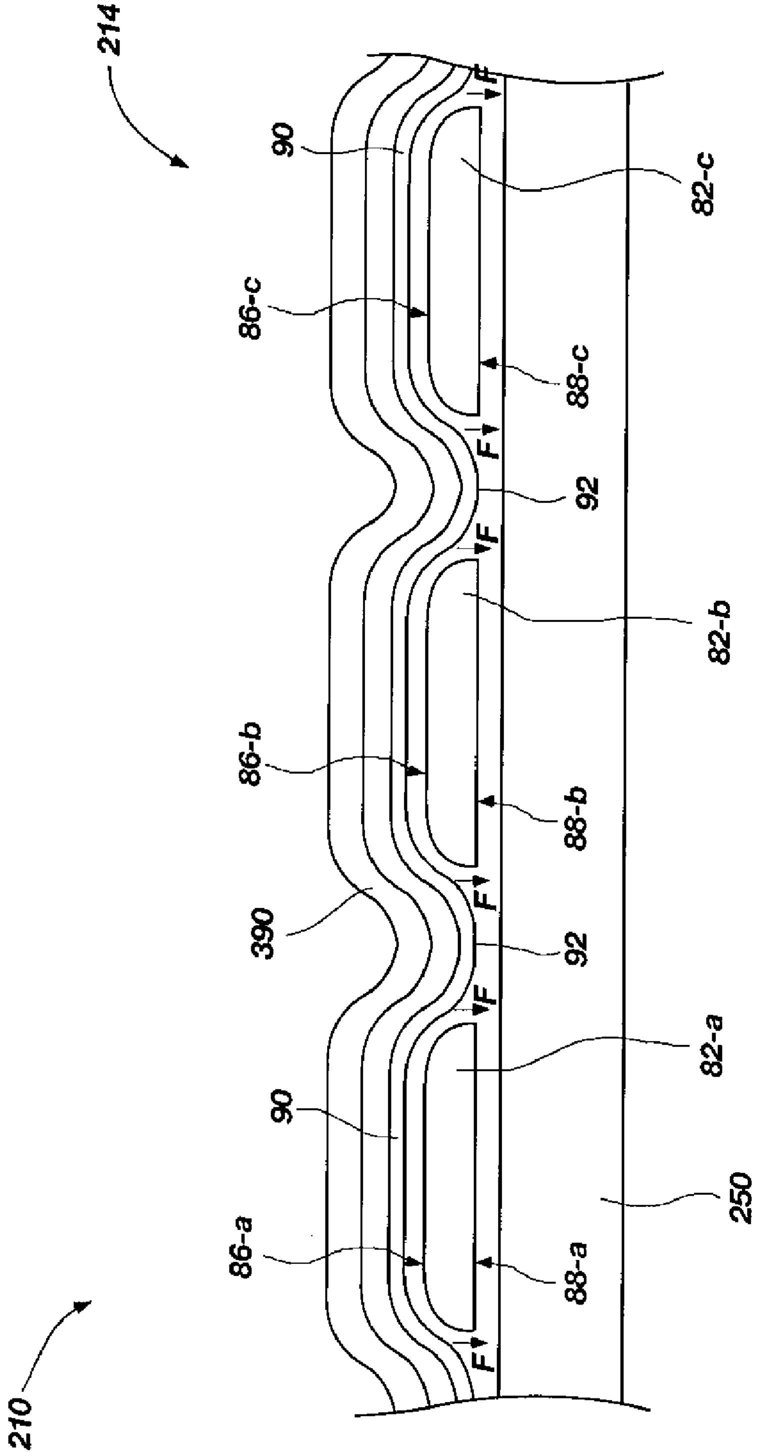
FIG. 8 illustrates a cut-away, cross-sectional view of another exemplary printing configuration utilizing the printing press of FIG. 4-A.

FIG. 8 illustrates another exemplary printing configuration. Specifically, FIG. 8 illustrates a cross-sectional and cutaway side view of the primary components of the present invention printing system 210, and particularly the printing press 214, of FIGS. 4-A-6, shown in a closed position and shown comprising a plurality of deformable cast polymer articles 82-*a*, 82-*b*, and 82-*c* positioned between a pressure applicator 390, in the form of a flexible, deformable membrane, and a pressure platen 250 for the purpose of preparing respective finished surfaces 86-*a*, 86-*b*, and 86-*c* of the deformable cast polymer articles for printing thereon, and for subsequently effectuating printing. Again, these components are shown somewhat exploded for reasons of explanation.

As can be seen from FIG. 8, each of the deformable cast polymer articles 82-*a*, 82-*b*, and 82-*c* are oriented upright such that their respective unfinished surfaces 88-*a*, 88-*b*, and 88-*c* are juxtaposed to the pressure platen 250. Thus, the finished surfaces 86-*a*, 86-*b*, and 86-*c* are juxtaposed to or adjacent the deformable pressure applicator or flexible membrane 390. Moreover, although not required, the deformable cast polymer articles are each shown having rounded corners or corner radii rather than linear edges, such as the deformable cast polymer article shown in FIG. 7.

An image transfer medium 90 is shown positioned between the finished surfaces of the deformable cast polymer articles and the pressure applicator 390. In this configuration, the image side 92 of the image transfer medium 90 is brought into contact with the finished surfaces 86 of the deformable cast polymer articles 82 and the printing press 214 actuated to prepare the finished surfaces 86 of the deformable cast polymer articles 82 for printing thereon, and to ultimately effectuate printing in a similar manner as described in FIG. 7, only with multiple deformable cast polymer articles and one or more image transfer mediums, and with the deformable cast polymer article(s) in an upright orientation so that the finished surface(s) are adjacent the deformable pressure applicator or flexible membrane. Indeed, the deformable cast polymer article may be oriented in an inverted or upright manner. Despite the rounded corners of the deformable cast polymer articles, the pressure applicator 390 conforms to the finishes surfaces 86 to again achieve even pressure across the finished surfaces 86 of the respective deformable cast polymer articles 82, and to again achieve an even image transfer on the finished surfaces 86.

As briefly discussed above, it is also contemplated that the edges and/or sides of a deformable cast polymer article, as well as various trim pieces, may be printed on using the systems and methods taught herein. The image transfer medium may comprise an image to be printed on a planar or other surface of the cast polymer article, as well as an extension thereof for printing onto the edges or other oriented surfaces of the cast polymer article or trim. Upon actuation of the printing press 214, the pressure applicator, under negative pressure, may cause at least a portion of the image transfer medium to extend over the edges of the deformable cast polymer article or trim piece and down around its sides in such a way so as to effectuate an image transfer thereon. The pressure applicator is preferably configured to deform enough to apply the necessary pressure to such surfaces and the image transfer medium oriented along or extending about such surfaces of the deformable cast polymer article or trim piece. It is also contemplated that various arbitrary or odd shapes of cast polymers may be printed on, as well as the side edges of these shapes. Such printing is not readily achievable in prior related printing presses.

In the exemplary condition shown, the pressure platen 250 is heated to a temperature between 350° and 400° F., the vacuum means is activated, and thus pressure exerted on the deformable cast polymer article between 4-12 psi for a duration of 6-8 minutes.

FIGS. 9-A and 9-B illustrate two exemplary printing configurations, wherein the cast polymer articles contained within the printing systems are intended to receive edge printing thereon. As shown in FIG. 9-A, the cast polymer article 82 is oriented upright so that its finished surface 86 is facing towards and is adjacent the deformable pressure applicator or flexible membrane 390, and its secondary surface resting on the pressure platen 250. The image transfer medium 90 is situated between the finished surface 86 and the flexible membrane 390 and is configured to extend beyond the edge 83 of the deformable cast polymer article 82. Thus, upon actuation of the printing press to create a negative pressure environment, the flexible membrane 390, as well as the image transfer medium 90, is caused to conform to the finished surface 86 of the cast polymer article 82, including its edges 83. As can be seen, the image transfer medium 90 is sized so that it covers all of the edge 83. Thus, edge 83 may be pressurized in a similar manner as the upper planar surface to receive a printed image thereon.

Depending upon the makeup of the flexible membrane 390, the degree of pressure induced via the negative pressure, and other factors, the flexible membrane 390 may not be able to pressurize the entire edge 83 of the cast polymer article 82. This is illustrated in FIG. 9-A with the flexible membrane 390 curving outward and away from the edge 83 near the bottom portion of the edge 83, thus leaving a gap, as shown. In this case, the edge 83 may not receive a complete image transfer as its bottom portion is not being pressurized by the flexible membrane 390. To solve this problem, FIG. 9-B illustrates the same printing configuration as that shown in FIG. 9-A, only a riser 450 is present and positioned between the cast polymer article 82 and the pressure platen 250. The riser 450 functions to elevate the cast polymer article 82 above the pressure platen 250 for the purpose of providing enough room for the flexible membrane 390 to pressurize the entire edge 83 of the cast polymer article 82. Preferably, the riser 450 is sized slightly under that of the cast polymer article 82, so that the edge 83 is caused to be positioned or located in an extended position from the riser 450. This is illustrated as distance x in FIG. 9-B. Providing a riser that allows the edge 83 to be located a distance beyond the edge of the riser 450 ensures that the riser 450 will not interfere with the flexible membrane 390 and that the entire edge 83, including its bottom portion, will be adequately pressurized, and thus receive printing thereon. However, this is not required as the riser 450 and the cast polymer article 82 may be sized so that the edge 83 of the cast polymer article and the edge of the riser 450 are flush with one another. In essence, using a riser 450 allows the flexible membrane 390 to extend below the cast polymer article 82 a sufficient distance in order to pressurize the entire edge 83 of the cast polymer article 82. Thus, the edge 83 may be prepared to receive an image transfer thereon that covers its entire surface. The height of the riser will depend upon the flexibility of the flexible membrane. In any event, the riser should be of a sufficient height so that as the flexible membrane begins to diverge from the riser/cast polymer article, it does so along the edge of the riser (see FIG. 9-B) rather than along the edge of the cast polymer article (see FIG. 9-A).

The present invention further contemplates different edge shapes that may be printed on using the technology described herein. For example, the cast polymer article may comprise an edge having an outwardly or convex curved design. The curved segment of the edge may be convex or concave, or the edge may comprise both linear and nonlinear segments. In this particular embodiment, the flexible membrane is still caused to conform to and pressurize the curved edge surface in a similar manner as the linear surface described above and shown in FIGS. 9-A and 9-B. However, because the image transfer medium is typically made of paper and therefore does not stretch, a separate secondary image transfer medium formed in a shape that corresponds to the size and geometry of the edge being printed on may be employed. This secondary image transfer medium may be positioned about the edge and held in place using any known means. As the printing system is actuated and a negative pressure environment created, the flexible membrane conforms to the curved surface thus forcing a portion of the primary image transfer medium against the edge. It does not matter if the primary image transfer medium rips because the presence of the secondary image transfer medium provides the necessary coverage of the edge to effectuate printing thereon. The secondary image transfer medium may also be configured so that a smooth or good visual transition occurs in the printed image from the upper planar surface of the cast polymer article to and along its edge. The ripping of the primary image transfer medium may be controlled. In other words, the primary image transfer medium may be configured to rip in a pre-determined location by placing pilot or other starter cuts therein.

The cast polymer article may further comprise inward or outward facing corners, with edges thereon. Similar to that described above, a secondary image transfer medium may be sized and shaped and positioned about the converging edges of these corners to achieve a good image transfer in the event it is expected that the primary image transfer medium will rip once forced down along the edge by the flexible membrane. It is also contemplated that several different image transfer mediums may be used to print on various shaped objects, as needed. The advantage of being able to print on an edge simultaneously with upper surface printing is that even printing is achieved, even in corners or along curved or other surfaces.

It is noted herein, however, that most outward facing corners will not require a separate or secondary image transfer medium. Another advantage of the present invention is that the deformable pressure applicator, in the negative pressure or vacuum printing system, is able to pressurize the converging edges and the corner sufficiently to fold the image transfer medium about the corner to achieve a high quality ink image transfer. If enough pressure is used, the deformable pressure applicator is capable of smoothing out any folds in the image transfer medium, or at least drawing the image transfer medium around the corner a sufficient amount to make any folds inconsequential, so as to achieve a high quality ink image transfer. The ability of the deformable pressure applicator to do this may depend upon its makeup and flexibility.

Figure 10:
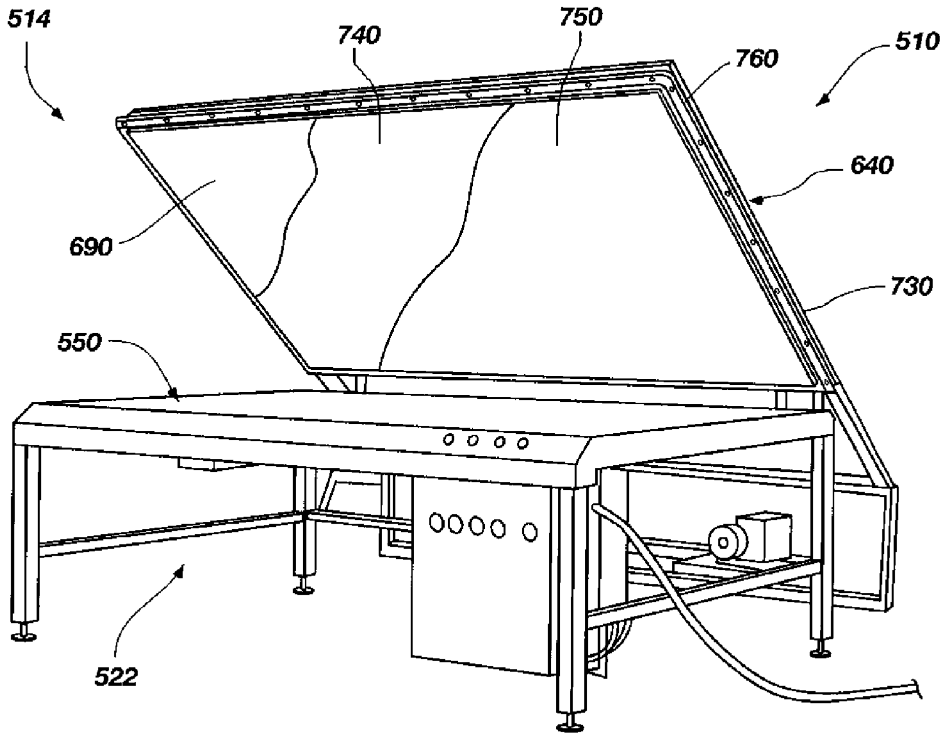
FIG. 10 illustrates a perspective view of a printing system according to another exemplary embodiment of the present invention similar to the printing system of FIG. 4-A, wherein the printing system of FIG. 9 comprises a breathable member to facilitate a satisfactory negative pressure environment and to reduce or eliminate the potential for the formation of air pockets within the printing system.

Referring now to FIG. 10, shown is a perspective view of another exemplary printing system similar to the exemplary printing system described above and shown in FIGS. 4-A-6, however, further comprising an additional frame structure configured to support a breathable member and a cover component. As such, the description corresponding to FIGS. 4-A-8 is incorporated herein where applicable. Specifically, FIG. 10 illustrates printing system 510 in the form of a printing press 514 having an upper frame assembly 640 and a lower frame assembly 522 that interact with one another and comprise similar components as the printing system 210 described above. Unlike the printing system 210, however, the printing system 510 comprises a secondary frame assembly 730 that is part of and coupled to the various beam components of the upper frame assembly 640. The secondary frame assembly 730 is configured to support a breathable member 740, shown as insulation board, which comprises a breathable and semi-rigid makeup. The breathable member 740 is configured to facilitate a more satisfactory negative pressure environment, as well as to better facilitate the even distribution of pressure about the deformable cast polymer article as applied by the pressure applicator 690 by reducing and/or eliminating the potential for the creation of air pockets within the vacuum chamber about the deformable cast polymer article once the vacuum means is activated and the air within the printing press 514 is evacuated. Due to its material makeup, the breathable member 740 compresses as the vacuum means is activated and the air evacuates while still maintaining its breathability. Under negative pressure, the breathable member 740 functions as an advantageous interface between the deformable cast polymer article and the pressure applicator or flexible membrane by providing a suitable and steady pathway for any remaining air to evacuate, thus achieving a more satisfactory negative pressure environment. By not employing a breathable member 740, pockets of air may have a tendency to form near or about the cast polymer article as this air is unable to escape from the vacuum chamber. These pockets of air have the potential, if of significant volume, to create uneven pressure application or uneven pressure distribution across or about the cast polymer article surfaces, thus making the even points contact that is desirable in the printing session difficult to achieve, and thus increasing the potential for a less than desirable or improper image transfer.

Covering the breathable member 740 is a cover component 750. Cover component 750 may comprise any flexible cloth-like or similar makeup, such as burlap, cotton, polyester, etc. Cover component 750 is configured to enclose and protect the breathable member 740, particularly in the event the breathable member is an insulation board. The cover may also comprise various identifying logos, symbols, trademarks, slogans, etc. to personalize or customize the printing system 510, or for various advertising purposes.

In still another embodiment, the breathable member and the cover component may be one and the same. In other words, the breathable member may comprise the cover itself, thus allowing the elimination of a breathable member having a semi-rigid makeup, such as in the form of insulation board or anther similar material. The cover component, acting as the breathable member, preferably comprises a high grade polyester makeup. The cover material, now as the breathable member, functions similar to the insulation board in reducing and/or eliminating the potential for the creation of air pockets within the vacuum chamber about the deformable cast polymer article. The cover material provides a suitable and steady pathway for any remaining air to evacuate, thus achieving a more satisfactory negative pressure environment. However, unlike a semi-rigid breathable member, the flexible cover, having a cloth-like material makeup, allows the breathable member to better conform to the various edges of the cast polymer article, including its edges, recesses, etc., in which case a better image transfer to these surfaces is achieved. In addition, a cloth or cloth-like breathable member with some degree of stretching may be used to better allow it to conform to edges, odd shapes, recesses, etc.

FIG. 10 further illustrates a sealant, shown as a rubber strip 760, located around the lower surface of the frame components of the upper frame assembly 640. The sealant, or rubber strip 760 functions to provide an air-tight seal between the upper frame assembly 640 and the lower frame assembly 522. It will be obvious to those skilled in the art that other types or forms of sealants may be used to achieve a suitable vacuum chamber between the upper and lower frame assemblies 640 and 522.

Figure 11:
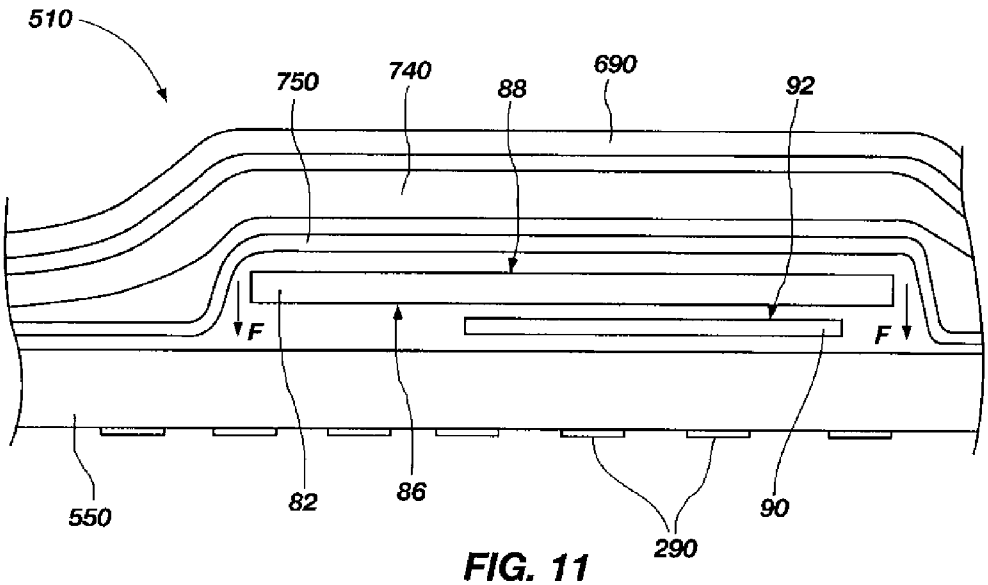
FIG. 11 illustrates a cut-away, cross-sectional view of another exemplary printing configuration utilizing the printing press of FIG. 10.

FIG. 11 illustrates another exemplary printing configuration. Specifically, FIG. 11 illustrates a cut-away, cross-sectional side view of the primary components of the printing system 510 discussed above and shown in FIG. 10. The components are shown in a closed position and are shown comprising a deformable cast polymer article 82 positioned between a pressure applicator 690, in the form of a flexible, deformable silicone membrane, and a pressure platen 550 for the purpose of preparing a finished surface 86 of the deformable cast polymer article 82 for printing thereon, and for subsequently effectuating printing. Again, these components are shown in exploded view for purposes of explanation.

As can be seen from FIG. 11, the deformable cast polymer article 82 is oriented in an inverted manner such that its unfinished surface 88 is facing upward toward the pressure applicator 690. Thus, the finished surface 86 of the deformable cast polymer article 82 is facing toward the pressure platen 550. An image transfer medium 90 is shown positioned between the finished surface 86 of the deformable cast polymer article 82 and the pressure platen 550. In this configuration, the image side 92 of the image transfer medium 90 is brought into contact with the finished surface 86 of the deformable cast polymer article 82. Once the cast polymer article 82 and image transfer medium 90 are positioned, the vacuum means that is fluidly coupled to the vacuum port (not shown) of the printing press 514 is actuated to evacuate the air from the vacuum chamber formed by bringing the upper frame assembly 640 down upon the lower frame assembly 522 to achieve a suitable air-tight seal between the two, as discussed above. Once this seal is created and once the vacuum means is activated, the air is evacuated from the vacuum chamber, as indicated by the arrows, and a negative pressure environment is created that causes the pressure applicator 690 to exert a force F upon the unfinished surface 88 of the deformable cast polymer article 82, and its edges, as shown. The pressure applicator 690 is configured to conform to the shape of the deformable cast polymer article 82, thus placing even pressure across the entire unfinished surface 88 regardless of the size or thickness or flatness variance of the deformable cast polymer article 82.

To ensure that even pressure distribution about the deformable case polymer article 82 is achieved, the printing press 510 employs a breathable member 740 positioned between the deformable cast polymer article 82 and the pressure applicator 690. A cloth 750 may also be employed, but is not necessary. As indicated above, the breathable member 740 functions to facilitate the evacuation of the air from the vacuum chamber once the vacuum means is activated, thus reducing the potential formation of one or more air pockets about or adjacent the deformable cast polymer article. Since the breathable member 740 provides a continual medium through which air may pass, unlike the pressure applicator 690, air is less likely to collect in pockets that could cause uneven distribution of pressure on or about the deformable cast polymer article 82.

Another significant advantage of providing a breathable member is that blurring between printing sessions is eliminated. Blurring in prior related sublimation printing systems is a common problem as there is an excess of ink gasses capable of causing a ghost image from having the print touch off on another point other than original point of contact. This typically occurs while removing the print, opening the machine, etc. For instance, it is not uncommon for the image transfer medium to comprise excess gasses after a printing session, which excess gasses can sublimate in an un desirable spot causing blurring when the image transfer medium is re-set at another location on the finished product. The breathable member functions to eliminate blurring by allowing the vacuum means coupled to the printing system to suck out or remove all of the excess or residual air or gasses that are capable of causing a blurring effect. Orienting the cast polymer article so that its finished surface is facing towards or is adjacent the deformable pressure applicator also helps to remove excess gasses during a printing session because the deformable pressure applicator is able to pressurize all or a majority of the points along the article's surfaces by being able to tightly conform to these surfaces.

Similar to the other embodiments discussed above, another advantage is that the deformable cast polymer article is held in place during the printing process, thus not allowing the article to expand until the pressure has been relieved and the image transfer completed. As such, the present invention eliminates one of the causes of blurring common in prior related printing presses.

As shown, the breathable member 740 is also preferably flexible so as to at least partially conform to the surface of the deformable cast polymer article 82. The finished surface of the deformable cast polymer article 82 is further prepared for printing, and printing carried out, similar to the methods described above.

FIG. 11 illustrates the deformable cast polymer article 82 in an inverted orientation with the breathable member 740 atop its unfinished surface 88. However, as will be recognized by one skilled in the art, the printing system 510 may be configured to secure the breathable member 740 to the lower frame assembly 522 such that it is positioned beneath the deformable cast polymer article 82.

In addition, although FIG. 11 illustrates the deformable cast polymer 82 in an inverted orientation, the present invention contemplates the deformable cast polymer 82 being oriented in an upright orientation with the finished surface facing towards the deformable pressure applicator or flexible membrane. Orienting the cast polymer article in this position helps achieve better edge printing.

Another significant advantage to orienting the cast polymer article so that its finished surface is adjacent the deformable pressure applicator or flexible membrane and away from the pressure platen (which receives and supplies heat) is that the temperature of the finished surface may be monitored and adjusted or varied as needed during a printing session as the cast polymer article is heated from its secondary surface. Indeed, the present invention provides the unique ability to monitor the finished surface of the cast polymer article while it is contained or supported within the printing press, while the printing press is actuated, including whatever heating means is employed, while the heat is being conducted through the cast polymer article from the secondary surface to the finished surface(s), and prior to and during image transfer.

The exemplary printing systems shown herein, in which a flexible membrane is used in conjunction with a negative pressure environment, lend themselves particularly well to the ability to monitor the surface of the cast polymer article as all or a portion of the backside of the flexible membrane may be exposed. Indeed, in a negative pressure system, no backside support is needed on the flexible membrane, or at least not a great amount of support is needed. Thus, by exposing the backside of the flexible membrane, the temperature of the flexible membrane may be measured and monitored, and the heating means adjusted to provide optimal heating of the cast polymer article for optimal and timely image transfer.

In operation, whatever measuring device or sensor is used will measure the temperature of the backside of the flexible membrane. Depending upon the thickness of the flexible membrane, a temperature differential will exist between the cast polymer article, namely its finished surface, and the backside of the flexible membrane. Various calculations and/or calibrations may be performed to enable a reading of the temperature of the flexible membrane to accurately reflect the temperature of the finished surface of the cast polymer article. Measuring the temperature of the flexible membrane to obtain the temperature of the finished surface of the cast polymer article will enable users to identify different thicknesses or variations in the cast polymer article and to make sure all of the article is uniformly heated to a proper temperature prior to and to obtain an optimal image transfer. Indeed, multiple measurements may be selectively taken at multiple locations about the flexible membrane, and thus the cast polymer article, to obtain accurate temperature readings of the entire finished surface or surfaces (including any edges, recesses, raised panels, corners, etc.) of the cast polymer article. Once the one or more heating means is/are activated, heat will begin to conduct through the cast polymer article from its secondary or unfinished surface to its finished surface(s). If there are variations in the thickness of the cast polymer article, or if there are other shape variations, the finished surfaces may not heat uniformly or at the same time, thus causing some areas to be too hot and some areas to be not hot enough at the time of image transfer. Extreme temperature differentials about the finished surface(s) can potentially lead to flaws and other problems during the actual image transfer, as well as yellowing of the finished surface.

Knowing the temperature of different parts or areas of the finished surface of the cast polymer article allows the user to better balance the temperature in these areas to optimize the image transfer process and to reduce flaws in the image transfer and damage to the finished surface of the cast polymer article. For example, if measurements at one area of the finished surface are above or below other areas, then the heating means can be adjusted to compensate for the differential and to bring all of the measured temperatures in line with one another or within a certain established and acceptable range. As such, the present invention contemplates the printing systems described herein as comprising a heating means capable of adjustment and capable of supplying different amounts of heat, or multiple heating means working in conjunction with one another.

In one exemplary method, an infrared (IR) device may be used to measure and monitor the temperature of the flexible membrane, and particularly the backside of the flexible membrane. One skilled in the art will recognize other types of temperature measuring or sensing devices that may be used.

It is noted herein, that the exemplary printing configurations illustrated in FIGS. 7, 8, 9, and 11 are general in nature as comprising a pressure platen, a deformable cast polymer article, and a pressure applicator that may be achieved by any number of printing systems appropriately configured to provide such a printing configuration. As such, the printing system of FIGS. 4-6, and 10 used to achieve these printing configurations are not meant to be limiting in any way.

Image Transfer Medium and Ink Image

The present invention contemplates the use of any one or more of the various image transfer techniques known in the art. In particular, the present invention contemplates using any printing process in combination with one or more ink or dye sublimation techniques. The types of ink or dye compositions making up the ink images, the types of image transfer mediums supporting these ink images, as well as the printing parameters preferably employed for these compositions, that are particularly suited for use with the present invention are disclosed in U.S. Pat. Nos. 5,830,263 to Hale, U.S. Pat. No. 5,734,396 to Hale, U.S. Pat. No. 5,642,141 to Hale, U.S. Pat. No. 5,640,180 to Hale, U.S. Pat. No. 5,601,023 to Hale, U.S. Pat. No. 5,488,907 to Xu, and U.S. Pat. No. 5,487,614 to Hale, each of which are incorporated by reference herein in their entirety. A general discussion of these reference and their disclosed subject matter is presented herein, as applicable to the present invention.

In the present invention, an ink image is formed and supported by or on a suitable image transfer medium, wherein the ink image corresponds to or is arranged to enable a predetermined image to be transferred to the finished surface of the deformable cast polymer article. The image transfer medium comprises any deformable material capable of receiving and supporting an ink image thereon, and that conforms to a surface under pressure. In general, the image transfer medium includes materials that can be printed on by a digital or other printer, materials that will withstand the temperatures needed to effectuate the ink or dye transfer, and materials that will facilitate sublimation of the dye or ink into the finished surface of the deformable cast polymer article. In some exemplary embodiments, the image transfer medium comprises standard bond paper. In another exemplary embodiment, the image transfer medium comprises paper composed for use with ink jet printers. In short, the image transfer medium may comprise any suitable paper or material for use with thermal printers, ink jet printers, laser printers, or any other dye-sublimation printing device. In still other exemplary embodiments, the image transfer medium comprises various fabrics, cloths, or films.

The ink image comprises a dye or ink applied to the image transfer medium for the specific purpose of being transferred to a deformable cast polymer article. The dye or ink may be applied to the image transfer medium using any suitable application means. In one exemplary embodiment, the ink is applied using a liquid or solid ink printing device, namely an ink jet printer. The ink jet printer may be of any suitable type, such as a bubble-type ink jet printer, a free flow ink jet printer, a phase change ink jet printer, a piezio electric ink jet printer, and others. In another exemplary embodiment, the ink is applied to the image transfer medium using an electrographic printing device, such as a laser printer. In still another exemplary embodiment, the ink is applied to the image transfer medium using a ribbon printing device. In essence, the present invention contemplates for use any suitable printing device or application means known in the art that is capable of applying an ink or dye to an image transfer medium, wherein the ink or dye is suspended on the image transfer medium until transfer (i.e., the ink is printed onto the image transfer medium at a temperature low enough to apply the ink, but not high enough to activate the dye as required for transfer and subsequent sublimation).

The inks or dyes used in the ink image are comprised of various compositions. In one exemplary embodiment, the ink image is comprised of a dye composition produced from sublimation, dye diffusion, or heat sensitive dyes. Dye solids of small particle size are dispersed in a liquid carrier, and one or more agents are used to maintain a colloidal, dispersion or emulsion system.

In another exemplary embodiment, the ink image is comprised of a solid dye composition that comprises heat activated dyes, and a phase change material, or transfer vehicle that will liquefy upon the application of heat to the ink image, and particularly the dye composition. A polymer binder and additives may also be added to the dye composition.

In another exemplary embodiment, the ink image is comprised of a liquid dye composition produced from sublimation, dye diffusion, or heat sensitive dyes. The composition may comprise monomer or polymer materials in either solvent or emulsion form, an initiator or catalyst, a surface tension control agent, a dispersing agent, humectants, a corrosion inhibitor, a flow control aid, a viscosity stabilization aid, an evaporation control agent, a fungicide, an anti-foaming chemical, a fusion control agent, and antioxidants.

In another exemplary embodiment, the ink image is comprised of a dry toner composition comprising heat activated dyes encased in a molecular sieve product, one or more binder polymers, and/or one or more charge control additives.

These and other exemplary sublimation compositions may be provided as obtained from Sawgrass Technologies, Inc.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not expressly recited, except in the specification. Accordingly, the scope of the invention should be determined solely by the appended claims and their legal equivalents, rather than by the descriptions and examples given above.

What is claimed and desired to be secured by Letters Patent is:

1. A printing system for printing onto a deformable article, said printing system comprising:

a support structure;

a pressure platen supported by said support structure that supports thereon a deformable article in preparation for printing thereon;

an image transfer medium having an ink image configured to be positioned contiguous with a surface of said article, and to sublimate a printed image onto said surface;

an actuatable, deformable pressure applicator supported by said support structure in a position relative to said pressure platen and configured to conform and apply even pressure to a surface of said article, and to force an opposing surface of said article, under heat, against said pressure platen, said pressure applicator also being configured to cause said image transfer medium to conform to said surface such that substantially all of said ink image is caused to be in contact with at least a portion of said surface; and means for heating said pressure platen to effectuate conductive heat transfer to said deformable article to cause at least a portion of said article to undergo inelastic deformation and conform to said pressure platen, and to effectuate said sublimation of said ink image to said surface to form said image, said means for heating providing progressive heating of said deformable article from said opposing surface in contact with said pressure platen to said surface to optimize heat exposure about and prevent damage to said surface.

2. The printing system of claim 1, wherein said pressure applicator is configured to apply a sufficient amount of pressure so as to eliminate any defects in said image caused by a folds or a wrinkle in said image transfer medium and/or any breathable member present in said printing system.

3. The printing system of claim 1, wherein said deformable article comprises a cast polymer article.

4. The printing system of claim 1, wherein said deformable article comprises a substantially planar configuration.

5. The printing system of claim 1, wherein said deformable article comprises a makeup selected from the group consisting of a polymeric resin, a polyester resin, an acrylic resin, a urethane resin, and an epoxy resin.

6. The printing system of claim 1, wherein said deformable article comprises an arbitrary shape having at least one solid surface for printing thereon, said solid surface comprising a shape selected from the group consisting of arbitrary, planar, curved, and any combination of these.

7. The printing system of claim 6, wherein said solid surface is selected from the group consisting of polyester cloth, PVC, ABS, various acrylics, polycarbonate, powder coated articles having polyester coatings, steel, coated steel, glass tiles or sheets having an acrylic or polyester coating, ceramic tiles, polyester coated paper, fiberglass parts, skis, PETG, and powder coated aluminums.

8. The printing system of claim 7, wherein said deformable article comprises a gel coat disposed about at least one of its surfaces, said ink image being positioned adjacent said gel coat to effectuate sublimation thereto to form said image thereon.

9. The printing system of claim 8, wherein said ink image is applied to a surface of said article prior to application of said gel coat.

10. The printing system of claim 1, wherein said actuatable, deformable pressure applicator comprises an inflatable bladder operable with a positive pressure source.

11. The printing system of claim 1, wherein said actuatable, deformable pressure applicator comprises a flexible membrane operable with a negative pressure source to apply said even pressure to said surface of said article.

12. The printing system of claim 11, wherein said flexible membrane is configured to be in fluid connection with said negative pressure system so as to form a seal about said article and pressurize said article against said pressure platen, wherein actuation of said negative pressure system to a predetermined negative pressure functions to evacuate the air within a volume of space bounded by said flexible membrane to form said seal, and to cause said flexible membrane to apply said even pressure to said article.

13. The printing system of claim 1, wherein said support structure comprises:

- a movable cart component comprising:
  - an upper beam support assembly;
  - a plurality of legs extending from and supporting said upper beam support assembly;
  - a solid surface supported by said upper beam assembly and supporting said pressure applicator, said pressure applicator being supported in a sealed configuration about said upper beam support assembly;
- a stationary press component operable with and configured to removably couple said movable cart component, said stationary press comprising:
  - an upper beam assembly supporting said pressure platen;
  - a plurality of legs supporting said upper beam assembly; and
  - a lower beam assembly positioned below said upper beam assembly, said upper and lower beam assemblies forming a channel configured to receive said upper beam assembly of said movable cart to bring said article into a position relative said pressure platen, wherein upon actuation of said pressure applicator, said stationary press and said movable cart operate to provide the structural support necessary to allow said surface of said article to be pressed against said pressure platen.

14. The printing system of claim 13, wherein a height of said movable cart component relative to said stationary press component is adjustable.

15. The printing system of claim 13, wherein said pressure applicator comprises an actuatable, inflatable bladder disposed over said solid surface and sealed to said upper beam support assembly, said inflatable bladder being configured to receive said article thereon, said inflatable bladder also being configured to press said opposing surface of said article against said pressure platen once inflated, as well as to support and pressurize said surface of said article.

16. The printing system of claim 1, wherein said support structure comprises:

- a lower frame assembly supported about a floor and comprising:
  - a series of beams configured to receive and support said pressure platen;
  - a raised frame operable with said lower frame assembly and supported above said pressure platen to define a series of gaps to facilitate airflow about a surface of said pressure platen;
  - one or more vacuum chamber bottom covers operable with said lower frame assembly to provide a lower barrier of a vacuum chamber;
  - a vacuum port in fluid communication with said vacuum chamber and a negative pressure source, and configured to facilitate removal of air from said vacuum chamber;
  - a plurality of heat strips supported about said pressure platen and configured to heat said pressure platen and said deformable article;
- an upper frame assembly pivotally mounted to and configured to releasably seal against said lower frame assembly, said upper frame assembly comprising:
  - a series of beams configured to receive and support said pressure applicator, said pressure applicator being configured to conform to said deformable article upon actuation thereof and evacuation of air from said vacuum chamber.

17. The printing system of claim 16, further comprising a counterweight operable with said upper frame assembly to balance said upper frame assembly about a pivot point.

18. The printing system of claim 16, wherein said upper frame assembly is configured to seal against said lower frame assembly via portions of said pressure applicator as extending about said series of beam supports of said upper frame assembly, wherein said portions of said pressure applicator contact said series of beams of said lower frame assembly.

19. The printing system of claim 16, wherein said upper frame assembly is configured to seal against said lower frame assembly via a perimeter seal applied to said beam components of said upper frame assembly.

20. The printing system of claim 16, further comprising a breathable member operably supported within said printing system, said breathable member being configured to provide a steady pathway for air to evacuate to reduce potential for air pockets within said vacuum chamber and about said deformable article, thus facilitating even distribution of pressure to improve said even pressure about said deformable article as applied by said pressure applicator, said breathable member also reducing blurring by facilitating the increased removal of excess gasses.

21. The printing system of claim 20, wherein said breathable member is supported within a secondary frame support operable with said upper frame assembly.

22. The printing system of claim 20, further comprising a cover component operable with said breathable member to enclose and protect said breathable member.

23. The printing system of claim 20, wherein said breathable member is selected from the group consisting of a flexible, cloth-like material configured to conform to said deformable article, a semi-rigid, compressible material, and any combination of these.

24. The printing system of claim 16, further comprising means for monitoring a temperature about a point of said pressure applicator, and thus indirectly a temperature of a point of said deformable article, to ensure uniform heating of said deformable article, and therefore to optimize said sublimation of said ink image thereto.

25. The printing system of claim 24, wherein said means for monitoring comprises a plurality of sensors located about a surface of said pressure applicator opposite one adjacent said deformable article, each of said sensors being configured to measure a temperature of a specific location of said pressure applicator, and thus a temperature of a specific location of said deformable article corresponding thereto.

26. The printing system of claim 24, wherein said means for monitoring comprises an infrared device configured to sense said temperature of said point about said pressure applicator.

27. The printing system of claim 24, wherein said means for heating is adjustable depending upon said temperature of said pressure applicator as measured by said means for monitoring.

28. The printing system of claim 27, wherein said means for heating is configured to heat different parts of said deformable article at different rates to account for any differences in said temperature about said pressure applicator as measured by said means for monitoring, and to ensure said uniform heating of said deformable article.

29. The printing system of claim 1, wherein said image transfer medium and said pressure applicator are configured and operable to print onto an edge of said deformable article, said image transfer medium being pressurized and drawn and forced against said edge by said pressure applicator.

30. The printing system of claim 29, further comprising a riser configured to elevate said deformable article a distance above said pressure platen, as supported thereon, sufficient to facilitate conformance to and pressurization of all of said edge by said pressure applicator.

31. The printing system of claim 30, wherein said riser is sized and configured so that said edge is oriented in an extended position from said riser so that said riser does not interfere with said pressure applicator.

32. The printing system of claim 1, further comprising a secondary image transfer medium operable with said image transfer medium to print onto said deformable article.

33. The printing system of claim 1, wherein said image transfer medium comprises at least one pilot cut formed therein to control the location of any tearing of said image transfer medium as being configured to print onto said deformable article.

34. The printing system of claim 1, wherein said means for heating comprises a plurality of heat strips operable with said pressure platen, such that, upon contact of said article with said pressure platen, a surface of said article is heated.

35. The printing system of claim 1, wherein said means for heating is configured to inelastically deform said deformable article.

36. The printing system of claim 1, wherein said deformable article is oriented so that said pressure applicator applies pressure to a finished surface of said deformable article, and wherein said image transfer medium is positioned between said finished surface and said pressure applicator.

37. The printing system of claim 1, wherein said deformable article is oriented so that said pressure applicator applies pressure to a secondary surface, opposite a finished surface, of said deformable article, and wherein said image transfer medium is positioned between said finished surface and said pressure platen.

38. The printing system of claim 1, further comprising means for adjusting the flatness of said pressure platen.

39. A method for printing onto an article, said method comprising:

obtaining a deformable article;

supporting said deformable article in a printing press about a pressure platen and an actuatable, deformable pressure applicator positioned relative to one another;

positioning a deformable image transfer medium adjacent said deformable article, said image transfer medium supporting one or more inks arranged in an ink transfer image configured to transfer an image to said deformable article;

aligning said deformable article with said pressure platen;

actuating said pressure applicator to apply even pressure to a surface of said deformable article and to force an opposing surface against said pressure platen, as well as to cause said image transfer medium to conform to at least a portion of said deformable article;

heating said pressure platen to facilitate progressive conductive heating of said deformable article from said opposing surface in contact with said pressure platen to said surface in order to optimize heat exposure about and prevent damage to said surface, and to cause said deformable article to inelastically deform against said pressure platen as pressurized by said pressure applicator;

causing said opposing surface of said deformable article to conform to and achieve an all points contact with said pressure platen to prevent damage to said deformable article; and optimizing heat exposure about said surface to effectuate high resolution sublimation of said image to said deformable article.

40. The method of claim 39, further comprising supporting interchangeable actuatable, deformable pressure applicators of different physical characteristics in said printing press to better accommodate different deformable articles having different surface characteristics.

41. The method of claim 39, wherein said step of supporting comprises positioning said deformable article in said printing press so that a surface of said deformable article configured to receive said image is oriented towards said pressure applicator, to be pressurized thereby, with said image transfer medium being positioned between said pressure applicator and said deformable article.

42. The method of claim 39, wherein said step of supporting comprises positioning said deformable article in said printing press so that a surface of said deformable article configured to receive said image is oriented towards said pressure platen, with said image transfer medium being positioned between said pressure platen and said deformable article.

43. The method of claim 39, wherein said step of actuating said pressure applicator comprises inflating an inflatable bladder operably coupled to a positive pressure source.

44. The method of claim 39, wherein said step of actuating said pressure applicator comprises evacuating air from a flexible membrane operable with a negative pressure source, and configured to facilitate a sealed environment about said deformable article and at least a portion of said pressure platen.

45. The method of claim 39, further comprising:

monitoring, during a printing session, the temperature of a surface of said deformable article configured to receive said image; and adjusting said heat to vary, as needed, and optimize said temperature of said surface configured to receive said image.

46. The method of claim 45, wherein said step of monitoring comprises:

monitoring a temperature of an exposed side of said pressure applicator, said surface of said deformable article configured to receive said image being positioned adjacent said pressure applicator;

determining said temperature of said surface of said deformable article configured to receive said image from said temperature of said exposed side of said pressure applicator.

47. The method of claim 39, wherein said step of monitoring comprises monitoring the temperature of multiple locations about said surface of said deformable article configured to receive said image.

48. The method of claim 45, wherein said step of monitoring comprises placing a plurality of sensors about said pressure applicator, which said sensors function to measure directly the temperature at respective locations about said pressure applicator, and therefore indirectly said surface of said deformable article configured to receive said image.

49. The method of claim 45, wherein said step of adjusting comprises selectively adjusting at least one of a plurality of heating means, each configured to supply heat to said pressure platen, and each operating together to supply different amounts of heat to said pressure platen and therefore said deformable article, as needed, to compensate for any temperature differentials thereabout.

50. The method of claim 39, wherein said optimizing said heat exposure comprises manipulating the temperature about different parts of said surface of said deformable article as said article is heated.

* * * * *